United States Patent
Schelfaut

(10) Patent No.: US 10,414,507 B2
(45) Date of Patent: Sep. 17, 2019

(54) ADAPTIVE ACTIVE CLEARANCE CONTROL LOGIC

(71) Applicant: General Electric Company, Schenectady, NY (US)

(72) Inventor: Timothy Leo Schelfaut, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 204 days.

(21) Appl. No.: 15/454,581

(22) Filed: Mar. 9, 2017

(65) Prior Publication Data

US 2018/0258785 A1   Sep. 13, 2018

(51) Int. Cl.
*B64D 27/10*   (2006.01)
*F01D 11/24*   (2006.01)

(52) U.S. Cl.
CPC .............. *B64D 27/10* (2013.01); *F01D 11/24* (2013.01); *F05D 2260/81* (2013.01); *F05D 2260/821* (2013.01); *F05D 2270/707* (2013.01); *F05D 2270/708* (2013.01); *F05D 2270/709* (2013.01); *F05D 2270/71* (2013.01)

(58) Field of Classification Search
CPC . F01D 11/20; F01D 5/12; B64D 27/10; F05D 2220/323; F05D 2240/307; F05D 2270/11; F05D 2270/54; F05D 2270/71
See application file for complete search history.

(56) References Cited

U.S. PATENT DOCUMENTS

| | | | |
|---|---|---|---|
| 4,513,567 A | 4/1985 | Deveau et al. | |
| 5,012,420 A | 4/1991 | Walker et al. | |
| 5,090,193 A | 2/1992 | Schwarz et al. | |
| 8,126,628 B2 | 2/2012 | Hershey et al. | |
| 8,973,373 B2 | 3/2015 | Arar | |
| 9,097,133 B2 | 8/2015 | Dong et al. | |
| 9,234,743 B2 | 1/2016 | Cotton | |
| 9,255,492 B2 | 2/2016 | Bacic | |
| 9,266,618 B2 | 2/2016 | Tillman et al. | |
| 9,309,777 B2 | 4/2016 | Webster et al. | |
| 2007/0276578 A1* | 11/2007 | Herron ............. | F01D 11/24 701/100 |

(Continued)

FOREIGN PATENT DOCUMENTS

EP   1031702 A1   8/2000

*Primary Examiner* — Sze-Hon Kong
(74) *Attorney, Agent, or Firm* — Dority & Manning, P.A.

(57) ABSTRACT

Systems and methods for adjusting blade tip clearance targets and utilizing the adjusted targets to optimize the clearances between the blade tips and surrounding shrouds of a turbine engine are provided. In one exemplary aspect, one or more engine controllers utilize a machine-learned model to customize blade tip clearance targets based on the way an engine has been uniquely operated in the past for a particular flight mission. Present flight data associated with a present flight of a given flight mission is obtained. A model blade tip clearance target is adjusted based at least in part on the machine-learned model and the present flight data. The machine-learned model is trained at least in part on past flight data indicative of the manner in which the turbine engine has been operated for one or more past flights of the flight mission. An adjusted blade tip clearance target is then generated.

20 Claims, 13 Drawing Sheets

(56) References Cited

U.S. PATENT DOCUMENTS

| | | | | |
|---|---|---|---|---|
| 2009/0037035 | A1* | 2/2009 | Hershey | F01D 11/24 701/3 |
| 2009/0064522 | A1* | 3/2009 | Herron | G01B 7/14 33/655 |
| 2010/0100248 | A1* | 4/2010 | Minto | F01D 11/20 700/287 |
| 2010/0183424 | A1* | 7/2010 | Roy | F01D 5/20 415/1 |
| 2014/0058644 | A1* | 2/2014 | Adibhatla | B64D 31/06 701/100 |
| 2015/0159499 | A1 | 6/2015 | Bacic et al. | |
| 2015/0247417 | A1* | 9/2015 | Bacic | F01D 21/14 415/1 |
| 2015/0369076 | A1* | 12/2015 | McCaffrey | F01D 11/24 415/173.1 |
| 2016/0004255 | A1* | 1/2016 | Moxon | G05D 1/0055 701/7 |
| 2016/0047269 | A1* | 2/2016 | Zacchera | F01D 21/003 416/1 |
| 2016/0326901 | A1* | 11/2016 | Rowe | F01D 11/24 |
| 2017/0240269 | A1* | 8/2017 | Cox | B64C 19/02 |
| 2018/0073382 | A1* | 3/2018 | Moxon | F01D 11/24 |

\* cited by examiner

ADAPTIVE ACTIVE CLEARANCE CONTROL LOGIC

FIELD

The present subject matter relates generally to gas turbine engines. More particularly, the present subject matter relates to active clearance control logic for gas turbine engines.

BACKGROUND

Optimization of turbine blade tip clearances can lead to better engine performance and efficiency. To adjust the clearance between the tips of the rotating turbine blades and a shroud, an Active Clearance Control (ACC) system may provide thermal control air which impinges on the turbine casing with the intent of adjusting the position of the casing and shrouds relative to the blade tips. More particularly, an engine controller (e.g., an Electronic Engine Controller (EEC) or Electronic Control Unit (ECU)) equipped with Full Authority Digital Engine Control (FADEC) may utilize a clearance algorithm to calculate instantaneous turbine blade tip clearances. The calculated clearances may then be compared to a blade tip clearance target. If the calculated clearances do not align with the clearance target, the ACC system may adjust the blade tip clearances to force the calculated clearances to agree with the clearance target. In this way, the shrouds are adjusted relative to the blade tips.

Despite the ability of ACC systems to control blade tip clearances, clearance targets are typically set without regard to how an engine is actually or uniquely operated. Rather, each engine of a particular engine model targets the same blade tip clearances regardless of how the engine is operated. Blade tip clearance targets have conventionally been set such that an aircraft can accelerate from a given speed to a maximum continuous speed at any moment (i.e., a snap accel). In many cases, an aircraft is very unlikely to perform such a maneuver, and thus, the clearance between the shrouds and the turbine blade tips may be set unnecessarily open, leading to less than optimal engine performance and efficiency.

Therefore, improved active clearance control logic for adjusting blade tip clearances based on the way an engine is actually or uniquely operated would be desirable.

BRIEF DESCRIPTION

Exemplary aspects of the present disclosure are directed to methods and systems for adjusting blade tip clearances based on the way an engine is actually or uniquely operated. Aspects and advantages of the invention will be set forth in part in the following description, or may be obvious from the description, or may be learned through practice of the invention.

In one exemplary aspect, the present disclosure is directed to a method for optimizing blade tip clearances of a turbine engine mounted to or integral with an aircraft for a flight mission. The method includes obtaining, by one or more engine controllers, present flight data associated with a present flight of the flight mission. The method also includes adjusting, by the one or more engine controllers, a model blade tip clearance target based at least in part on a machine-learned model and the present flight data, wherein the machine-learned model is trained at least in part on past flight data indicative of the manner in which the turbine engine has been operated for one or more past flights of the flight mission. The method further includes generating, by the one or more engine controllers, an adjusted blade tip clearance target.

In some various embodiments, during obtaining, the present flight data includes one or more waypoints such that the flight mission for the present flight can be determined.

In some various embodiments, the past flight data includes one or more past flight profiles indicative of a time at phase for the one or more past flights flown for the flight mission.

In some other various embodiments, the one or more past flight profiles are indicative of one or more cruise phases for the one or more past flights flown for the flight mission, and wherein when the aircraft is operating in the one or more cruise phases, the blade tip clearance target is adjusted to a predetermined target setting.

In some other various embodiments, the predetermined target setting is a minimum clearance setting.

In some other various embodiments, the predetermined target setting is set within a margin of a minimum clearance setting, and wherein the margin is within at least fifty percent of the minimum clearance setting.

In yet other various embodiments, the predetermined target setting is set within a margin of a minimum clearance setting, wherein the margin is within at least twenty-five percent of the minimum clearance setting.

In yet other various embodiments, the method further includes generating, by the one or more engine controllers, a confidence score associated with the adjusted blade tip clearance. The method further includes adjusting, by the one or more engine controllers, the margin based at least in part on the confidence score associated with the adjusted blade tip clearance.

In some various embodiments, the past flight data includes one or more past operating parameters indicative of the manner in which the turbine engine has been operated for the one or more past flights of the flight mission.

In some various embodiments, the one or more past operating parameters includes a core speed.

In yet other various embodiments, the one or more past operating parameters includes at least one of an aircraft gross weight and a fuel load of the aircraft.

In some various embodiments, the past flight data includes one or more past flight profiles indicative of one or more transition periods in which the aircraft is expected to perform an expected maneuver, wherein if the adjusted blade tip clearance target is adjusted to a predetermined target setting prior to entering one of the transition periods. The method further includes adjusting, by the one or more controllers, the adjusted blade tip clearance target back to the model blade tip clearance target during the transition period.

In some various embodiments, after the transition period, if the aircraft subsequently enters a cruise phase, the method further includes adjusting, by the one or more controllers, the model blade tip clearance target back to the adjusted blade tip clearance target at a predetermined target setting during the cruise phase.

In some various embodiments, the aircraft includes a flight management system communicatively coupled with the one or more engine controllers, and wherein the past flight data includes at least one or more past flight conditions and past flight management system data indicative of flight conditions and communications obtained from the flight management system for the one or more past flights flown for the flight mission.

In some various embodiments, the machine-learned model is a machine or statistical learning model structured as one of a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model and a k-means model.

In yet other various embodiments, the present flight data associated with a present flight for the flight mission includes one or more present operating parameters indicative of the manner in which at least one of the turbine engine and the aircraft is presently being operated for the present flight of the flight mission.

In yet other various embodiments, the past flight data includes one or more past flight profiles each indicative of a transition period in which an expected maneuver is expected to be performed.

In another exemplary aspect, the present disclosure is directed to a method for adjusting blade tip clearances between a rotor blade tip and a shroud of a turbine engine for a flight mission. The method includes comparing, by one or more engine controllers, an instantaneous blade tip clearance to an adjusted blade tip clearance target, wherein the adjusted blade tip clearance target is generated at least in part on a machine-learned model and present flight data, the present flight data being associated with a present flight of the flight mission. The method also includes aligning, by the one or more engine controllers, the instantaneous blade tip clearance with the adjusted blade tip clearance target; wherein the machine-learned model is trained at least in part on past flight data indicative of the manner in which the turbine engine has been operated for one or more past flights of the flight mission.

In some various embodiments, the past flight data includes one or more past flight profiles indicative of a time at phase for the one or more past flights flown for the flight mission.

In a further exemplary aspect, the present disclosure is directed to a system for adjusting blade tip clearances of a turbine engine during operation of a present flight of a flight mission. The system includes one or more engine controllers that include one or more processors and one or more memory devices, the one or more memory devices storing instructions that when executed by the one or more processors cause the one or more processors to perform operations. The engine controllers configured to: obtain present flight data associated with the present flight of the flight mission, the present flight data indicative of one or more waypoints of the present flight; adjust a model blade tip clearance target based at least in part on a machine-learned model and the present flight data; generate an adjusted blade tip clearance target indicative at least in part on the manner in which the turbine engine has been actually operated for one or more past flights of the flight mission; compare an instantaneous blade tip clearance to the adjusted blade tip clearance target, and align the instantaneous blade tip clearance with the adjusted blade tip clearance target.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
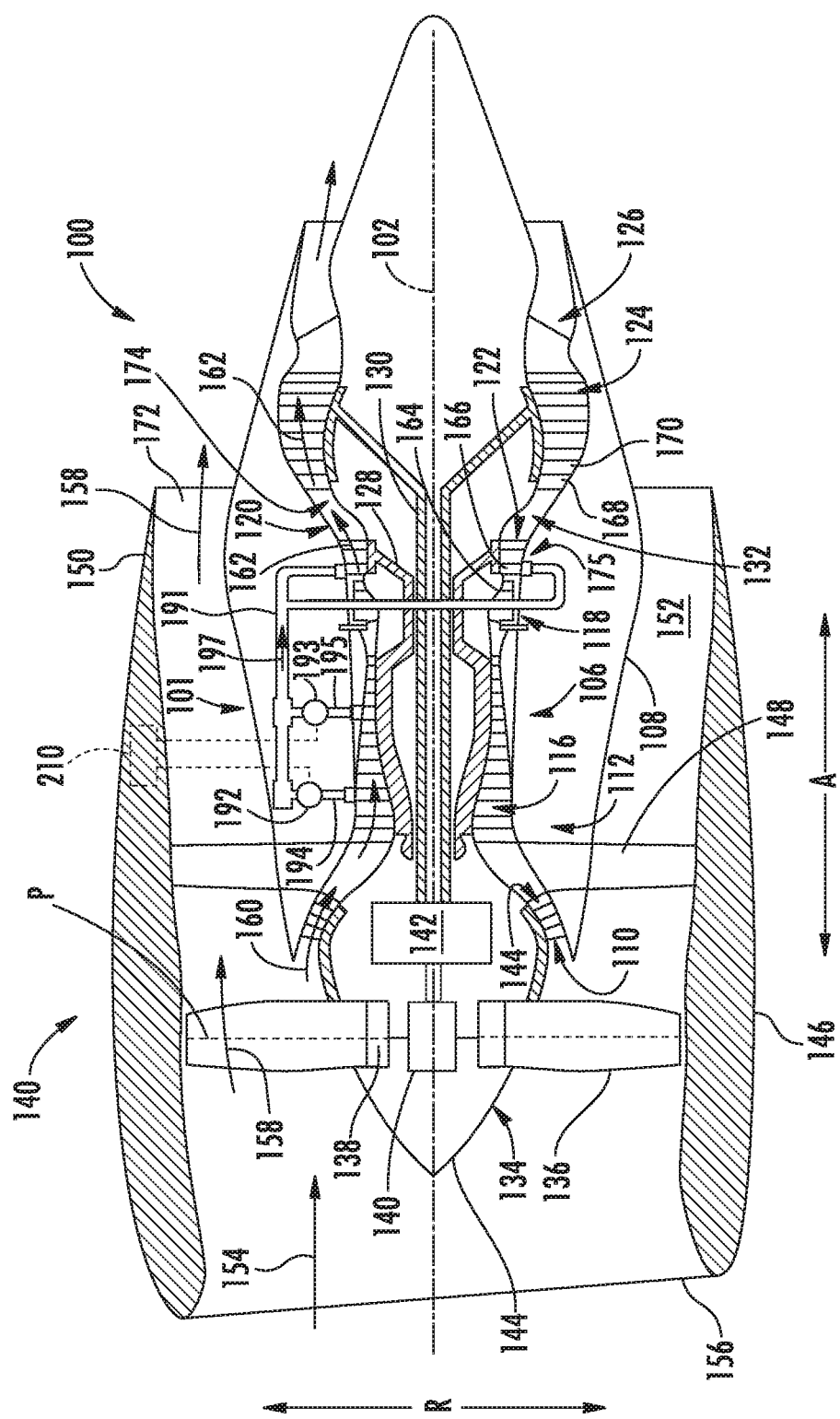
FIG. 1 provides a schematic cross-sectional view of an exemplary gas turbine engine according to exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Exemplary aspects of the present disclosure are directed to systems and methods for adjusting blade tip clearance targets and utilizing the adjusted blade tip clearance targets to optimize the blade tip clearances between the blade tips and surrounding shrouds. In one exemplary aspect, one or more engine controllers utilize a machine-learned model to customize blade tip clearance targets based on the way an engine is uniquely operated. Model blade tip clearance targets are adjusted based at least in part on the machine-learned model and present flight data, such as waypoint flight origin and destination information. The waypoints allow the engine controllers to determine the flight mission and if the flight mission has been flown in the past. If so, the machine-learned model generates an adjusted blade tip clearance target or a schedule of targets for the flight mission. As the machine-learned model is trained based at least in part on past flight data indicative of the manner in which the engine has been operated for past flights of the flight mission, such as past flight profiles, the machine-learned model outputs the adjusted blade tip clearance target that is tailored to the way the unique way the engine is operated.

By way of example, if the past flight profiles indicate that the aircraft is expected to fly at a cruise phase for three hours before performing a step climb maneuver (i.e., an altitude gain performed during cruise phase), the machine-learned model can be trained to recognize this pattern and can adjust the clearance targets for those initial three hours at cruise such that the blade tip clearances are set more closed than they would be otherwise. And when the expected step climb maneuver is anticipated or expected to be performed, the blade tip clearances can be set more open to accommodate the expected expansion of the turbine blades relative to the shrouds. By tracking the actual and unique way an aircraft is flown for a particular flight mission and adjusting the clearance targets accordingly, blade tip clearances can be better optimized, leading to improved engine performance and efficiency.

Referring now to the drawings, FIG. 1 provides a schematic cross-sectional view of a gas turbine engine 100 and an active clearance control (ACC) system 101 in accordance with exemplary embodiments of the present disclosure. For the embodiment of FIG. 1, the gas turbine engine 100 is an aeronautical, high-bypass turbofan jet engine configured to be mounted to or integral with an aircraft 200 (FIG. 3) in an under-wing configuration. As shown, the gas turbine engine 100 defines an axial direction A (extending parallel to or coaxial with a longitudinal centerline 102 provided for reference), a radial direction R, and a circumferential direction C (i.e., a direction extending about the axial direction A; not depicted). The gas turbine engine 100 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section 112 including a first, booster or LP compressor 114 and a second, HP compressor 116; a combustion section 118; a turbine section 120 including a first, HP turbine 122 and a second, LP turbine 124; and a jet exhaust nozzle section 126. An HP shaft or spool 128 drivingly connects the HP turbine 122 to the HP compressor 116. ALP shaft or spool 130 drivingly connects the LP turbine 124 to the LP compressor 114. The compressor section 112, combustion section 118, turbine section 120, and jet exhaust nozzle section 126 together define a core air flowpath 132 through the core turbine engine 106.

The fan section 104 includes a fan 134 having a plurality of fan blades 136 coupled to a disk 138 in a circumferentially spaced apart manner. As depicted, the fan blades 136 extend outwardly from disk 138 generally along the radial direction R. Each fan blade 136 is rotatable relative to the disk 138 about a pitch axis P by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by the LP shaft 130 across a power gear box 142. The power gear box 142 includes a plurality of gears for stepping down the rotational speed of the LP shaft 130 to affect a more efficient rotational fan speed.

Referring still to the exemplary embodiment of FIG. 1, the disk 138 is covered by rotatable spinner 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the core turbine engine 106. Moreover, the nacelle 146 is supported relative to the core turbine engine 106 by a plurality of circumferentially-spaced outlet guide vanes 148. Further, a downstream section 150 of the nacelle 146 extends over an outer portion of the core turbine engine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air 154 as indicated by arrows 158 is directed or routed into the bypass airflow passage 152 and a second portion of the air 154 as indicated by arrow 160 is directed or routed into the LP compressor 114. The pressure of the second portion of air 160 is then increased as it is routed through the HP compressor 116 and into the combustion section 118.

Referring still to FIG. 1, the compressed second portion of air 160 from the compressor section 112 mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the core turbine engine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define a hot gas path 174 for routing the combustion gases 162 through the core turbine engine 106.

With reference still to FIG. 1, the ACC system 101 includes a mid-stage air supply 194 and a high-stage air supply 195 that feed into a supply duct 191. The supply duct 191 provides a conduit for thermal control air 197 to flow from the HP compressor 116 of the compressor section 112 to the HP turbine 122 as shown. Additionally, or alternatively, although not shown, the supply duct 191 can be configured to deliver air from the fan section 104 to the HP turbine 122.

The mass flow and temperature of the thermal control air 197 is controlled by modulating the amount of air bleed from the mid-stage and high-stage air supplies 194, 195 by opening and closing mid-stage and high-stage control valves 192, 193, respectively. The control valves 192, 193 are controlled by and are communicatively coupled with one or more engine controller(s) 210, which is housed within nacelle 146 in this embodiment. Control valves 192, 193 are positioned along the supply duct 191 to selectively allow thermal control air 197 to flow to the HP turbine 122 or to other possible locations, such as to impingement rings (not shown) circumferentially enclosing the LP turbine 124. When one or both of the control valves 192, 193 are open, the relatively cool or hot thermal control air 197 flows to the HP turbine 122. When the thermal control air 197 reaches the HP turbine 122, a distribution manifold 175 distributes the thermal control air 197 about the HP turbine 122 such that the blade tip clearances can be controlled. Although the embodiment of FIG. 2 is shown having two control valves 192, 193, it will be appreciated that any suitable number of control valves can be included, such as e.g., one or more control valves can be positioned along a supply duct configured to deliver air from the fan section 104 to the HP turbine 122.

It will be appreciated that the exemplary gas turbine engine 100 depicted in FIG. 1 is by way of example only, and that in other exemplary embodiments, the gas turbine engine 100 may have any other suitable configuration. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aeroderivative gas turbine engine, such as a nautical gas turbine engine.

Figure 2:
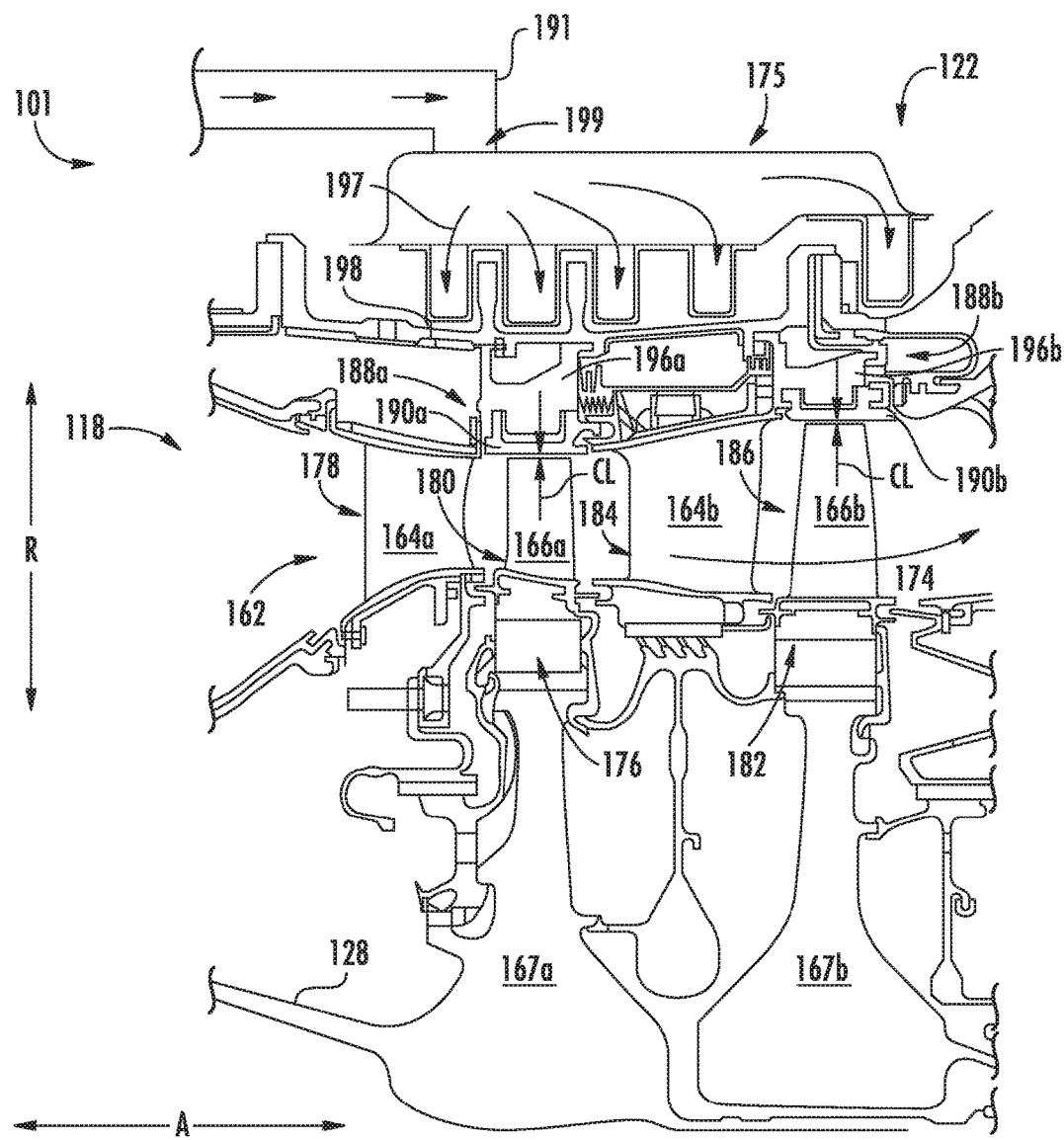
FIG. 2 provides a close-up, cross sectional view of the aft end of a combustion section and the forward end of an HP turbine of the gas turbine engine of FIG. 1 according to exemplary embodiments of the present disclosure.

FIG. 2 provides a close-up cross sectional view of the aft end of the combustion section 118 and the forward end of the HP turbine 122 of the gas turbine engine 100 of FIG. 1 according to exemplary embodiments of the present disclosure. As shown, the HP turbine 122 includes, in serial flow relationship, a first stage 176 which includes an annular array 178 of stator vanes 164a (only one shown) axially spaced from an annular array 180 of turbine rotor blades 166a (only one shown). The HP turbine 122 further includes a second stage 182 which includes an annular array 184 of stator vanes 164b (only one shown) axially spaced from an annular array 186 of turbine rotor blades 166b (only one shown). The turbine rotor blades 166a, 166b extend radially outwardly from and are coupled to the HP shaft or spool 128 (FIG. 1) by rotor disks 167a, 167b. The stator vanes 164a, 164b and the turbine rotor blades 166a, 166b rout combustion gases 162 from the combustion section 118 through the HP turbine 122 along the hot gas path 174.

As further depicted in FIG. 2, the HP turbine 122 may include one or more shroud assemblies 188a, 188b each forming an annular ring about an annular array of rotor blades 166. For example, exemplary shroud assembly 188a may form an annular ring around the annular array 180 of rotor blades 166a of the first stage 176, and exemplary shroud assembly 188b may form an annular ring around the annular array 186 of turbine rotor blades 166b of the second stage 182. For this embodiment, shroud assemblies 188a, 188b include shrouds 190a, 190b that are coupled with hangers 196a, 196b, which are in turn coupled with a turbine casing 198. In general, shrouds 190a, 190b of the shroud assemblies 188a, 188b are radially spaced from blade tips 192a, 192b of rotor blades 166a, 166b. A blade tip clearance CL is defined between the blade tips 192a, 192b and the shrouds 190a, 190b. It should be noted that the blade tip clearances CL may similarly exist in the LP compressor 114, HP compressor 116, and/or LP turbine 124. Accordingly, the present subject matter disclosed herein is not limited to adjusting blade tip clearances and/or clearance targets in HP turbines; rather, the teachings of the present disclosure may be utilized to adjust blade tip clearances and/or blade tip clearance targets in any suitable section of exemplary gas turbine engine 100.

As noted previously, the ACC system 101 modulates a flow of relatively cool or hot thermal control air 197 from the engine fan section 104 and/or compressor section 112 and disperses the air on the HP and/or LP turbine casing to shrink or expand the turbine casings relative to the HP/LP turbine blade tips depending on the operational and flight conditions of the aircraft and engine, among other factors. As shown more clearly in FIG. 2, the thermal control air 197 is routed to the HP turbine 122 via the supply duct 191. In some implementations, thermal control air 197 can be routed through a heat exchanger (not shown) for further cooling or warming of the air. The thermal control air 197 enters the turbine casing 198 through an inlet 199 defined by the turbine casing 198 and is distributed via distribution manifold 175 over the turbine casing 198. In this way, the blade tip clearances CL can be controlled.

It will be appreciated that engine performance is dependent at least in part on the blade tip clearances CL between the turbine blade tips and shrouds. Generally, the tighter the clearance between the blade tips and shrouds (i.e., the more closed the clearances), the more efficient the gas turbine engine can be operated. Thus, minimizing the blade tip clearances CL facilitates optimal engine performance and efficiency. A challenge in minimizing the blade tip clearances CL, however, is that the turbine blades expand and contract at different rates than the shrouds and casings circumferentially surrounding them.

More particularly, the blade tip clearances CL between turbine blade tips and the surrounding shrouds and turbine casings may be impacted by two main types of loads: power-induced engine loads and flight loads. Power-induced engine loads generally include centrifugal, thermal, internal pressure, and thrust loads. Flight loads generally include inertial, aerodynamic, and gyroscopic loads. Centrifugal and thermal engine loads are responsible for the largest radial variation in blade tip clearances CL. With regard to centrifugal loads, the rotor blades of turbine engines may mechanically expand or contract depending on their rotational speed. Generally, the faster the rotational speed of the rotor, the greater the mechanical expansion of the turbine blades and thus the further radially outward the rotor blades extend. Conversely, the slower the rotational speed of the rotor, the less mechanical expansion it experiences and thus the further radially inward the blades extend from the centerline longitudinal axis of the engine. With regard to thermal loads, as the engine heats up or cools down due at least in part to power level changes (i.e., changes in engine speed), the rotor and casings thermally expand and/or contract at differing rates. That is, the rotor is relatively large and heavy, and thus its thermal mass heats up and cools down at a much slower rate than does the relatively thin and light turbine casings. Thus, the thermal mass of the casings heats up and cools off much faster than the rotor. Accordingly, as an aircraft maneuvers and its engines perform various power level changes, the rotor and casings contract and expand at different rates. Meaning, they are sometimes not thermally matched. This leads to changes in the blade tip clearances CL, and in some cases, the turbomachinery components may come into contact with or rub one another, causing a rub event. For example, a rub event occurs where a blade tip 192a, 192b comes into contact with or touches a corresponding shroud 190a, 190b. Rub events may cause poor engine performance and efficiency, may reduce the effective service lives of the turbine blades 166a, 166b and/or the shrouds 190a, 190b, and may deteriorate the exhaust gas temperature margin of the engine. Thus, ideally, the blade tip clearances CL are set so as to minimize the clearance between the blade tips and the shrouds without the turbomachinery components experiencing rub events. The blade tip clearances CL are controlled by the ACC system 101, which is controlled by one or more engine controllers 210.

Figure 3:
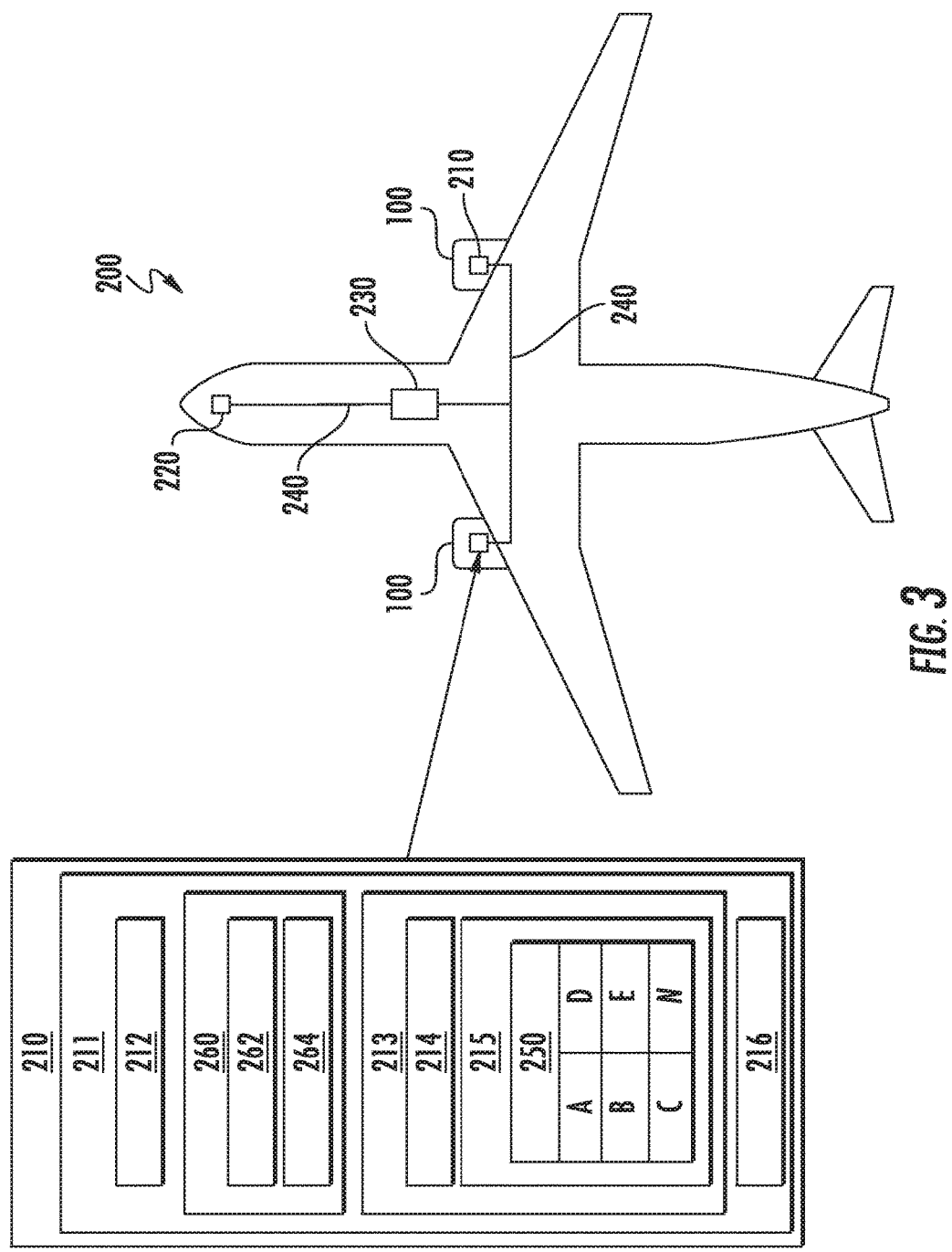
FIG. 3 provides an exemplary aircraft according to exemplary embodiments of the present disclosure.

FIG. 3 provides a schematic view of an exemplary aircraft 200 according to exemplary embodiments of the present disclosure. As shown, exemplary aircraft 200 includes one or more gas turbine engine(s) 100 and one or more engine controller(s) 210 configured to control the one or more engine(s) 100. For example, the gas turbine engine(s) 100 and engine controller(s) 210 can be the engines and engine controllers illustrated in FIGS. 1 and 2 and described in the accompanying text. For this embodiment, the aircraft 200 includes one engine 100 mounted to or integral with each wing of the aircraft 200. Each engine 100 is controlled by its respective engine controller 210. Each controller 210 can be, for example, an Electronic Engine Controller (EEC) or an Electronic Control Unit (ECU) of a Full Authority Digital Engine Control (FADEC) system. Each engine controller 210 includes various components for performing various operations and functions, such as e.g., those described herein for adjusting blade tip clearance targets and utilizing the adjusted targets to adjust blade tip clearances CL.

Engine controllers 210 can include one or more computing device(s) 211. The computing device(s) 211 can include one or more processor(s) 212 and one or more memory device(s) 213. The one or more processor(s) 212 can include any suitable processing device, such as a microprocessor, microcontroller, integrated circuit, logic device, and/or other suitable processing device. The one or more memory device(s) 213 can include one or more computer-readable media, including, but not limited to, non-transitory computer-readable media, RAM, ROM, hard drives, flash drives, and/or other memory devices.

The one or more memory device(s) 213 can store information accessible by the one or more processor(s) 212, including computer-readable instructions 214 that can be executed by the one or more processor(s) 212. The instructions 214 can be any set of instructions that when executed by the one or more processor(s) 212, cause the one or more processor(s) 212 to perform operations. In some embodiments, the instructions 214 can be executed by the one or more processor(s) 212 to cause the one or more processor(s) 212 to perform operations, such as any of the operations and functions for which the engine controller 210 and/or the computing device(s) 211 are configured, such as the operations for adjusting blade tip clearance targets or utilizing the adjusted blade tip clearance targets to adjust the blade tip clearances (e.g., methods (400), (500)), as described herein. The instructions 214 can be software written in any suitable programming language or can be implemented in hardware. Additionally, and/or alternatively, the instructions 214 can be executed in logically and/or virtually separate threads on processor(s) 212.

The memory device(s) 213 can further store data 215 that can be accessed by the one or more processor(s) 112. For example, the data 215 can include past flight data stored in a flight data library 250. The past flight data can contain past flight history for various flight missions such as e.g., Flight Mission A, Flight Mission B, Flight Mission C, and so on up to the Nth Flight Mission N. The past flight data associated with each flight mission can include past operating parameters, past flight conditions, past FMS data, and past flight profiles indicative of the manner and conditions of particular flights for the flight mission, for example. The data 215 can also include other data sets, parameters, outputs, information, etc. shown and/or described herein.

The computing device(s) 211 can also include a communication interface 216 used to communicate, for example, with the other components of the aircraft 200 (e.g., via communication network 230). The communication interface 216 can include any suitable components for interfacing with one or more network(s), including for example, transmitters, receivers, ports, controllers, antennas, and/or other suitable components.

As further shown in FIG. 3, the computing device 211 of the engine controller 210 includes various control model(s) 260 for modeling and controlling various control systems of the engine 100 and aircraft 200. In particular, control model(s) 260 includes an Active Clearance Control (ACC) model 262 and a High Efficiency Cruise (HEC) model 264, among other potential control models.

ACC model 262 is configured to control the blade tip clearances CL. The ACC model 262 calculates instantaneous blade tip clearances and compares the instantaneous clearance to a clearance target. If the instantaneous clearance is not aligned with the clearance target, the instantaneous clearance is forced to agree with the target. To force the two to agree, a communication is routed from the ACC model 262 via the communication interface 216 to the control valves 192, 193 of the ACC system 101. Thermal control air 197 can then be modulated to control the blade tip clearances CL (FIG. 1).

Figure 4:
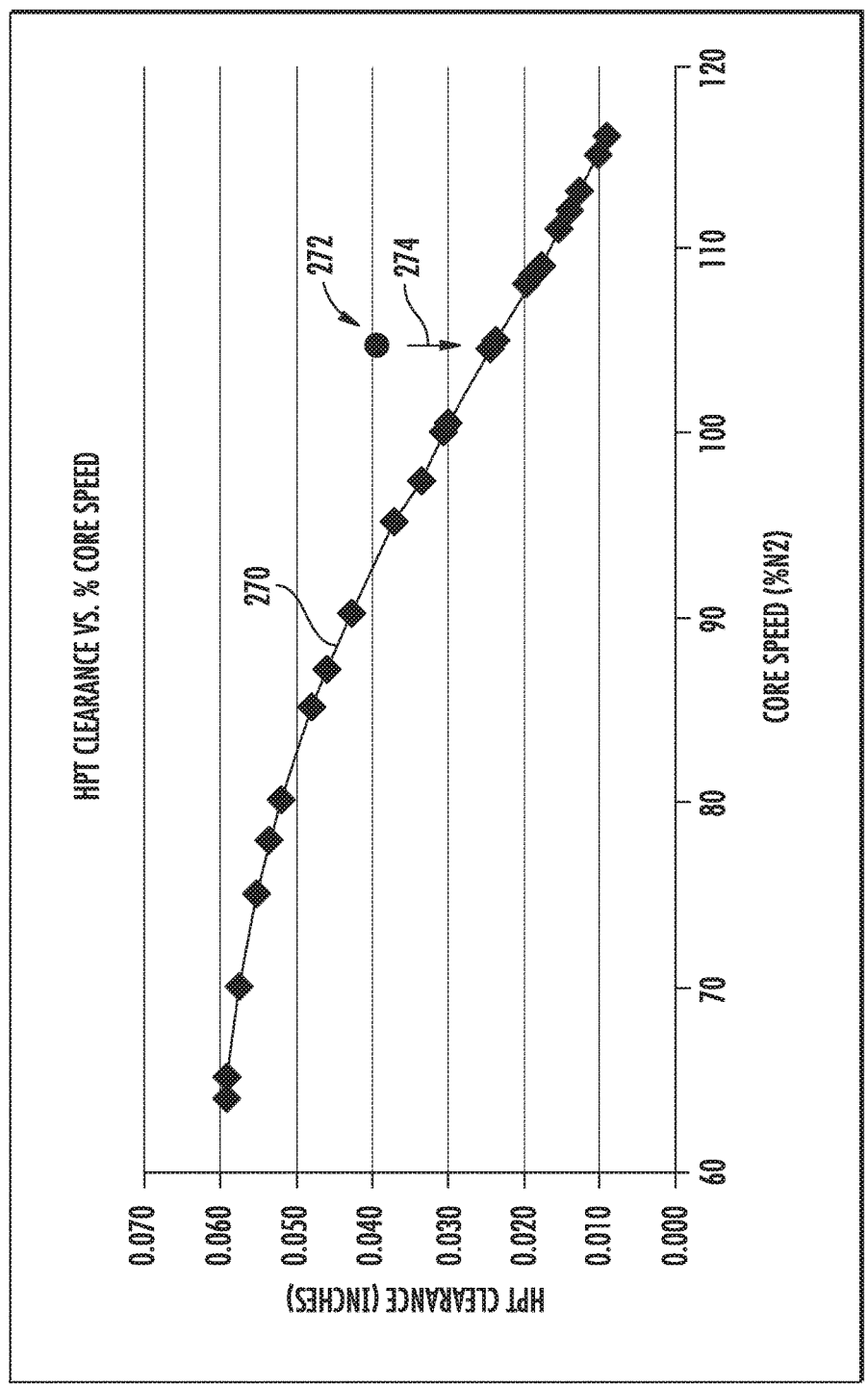
FIG. 4 provides model blade tip clearance targets plotted along a blade tip clearance versus core speed graph according to exemplary embodiments of the present disclosure.

By way of example, FIG. 4 provides a model blade tip clearance target 270 plotted along a blade tip clearance CL (inches) versus core speed (% N2) graph according to exemplary embodiments of the present disclosure. The model blade tip clearance targets 270 are a function of core speed, commonly denoted as N2. The core speed N2 is the speed of the HP shaft or spool 128 (FIG. 1). The model blade tip clearance targets 270 are typically set so that an accel can be completed from any given speed of the engine to a maximum continuous speed (i.e., so that a snap accel can be performed).

As shown in FIG. 4, the instantaneous blade tip clearance 272 for the HP turbine was calculated at 0.040 inches for a core speed of 105% N2. For a core speed of 105% N2, the model blade tip clearance target 270 is set at about 0.025 inches. As the instantaneous blade tip clearances 272 does not align with the model blade tip clearance target 270, the two are forced to agree, as shown by the downwards arrow 274. As mentioned above, the ACC system 101 forces the two to agree by modulating a flow of ACC thermal control air 197 to the HP turbine 122 (FIG. 1). The ACC model 262 will be described in greater detail later in the disclosure.

Although the model blade tip clearance targets 270 are shown as a function of core speed N2 in FIG. 4, it will be appreciated that the blade tip clearances CL can be a function of other suitable engine speed parameters. For instance, for a turboprop engine, a percentage of NP, or the speed of the propeller shaft could be used to determine the model blade tip clearance targets 270. As another example, N1, or the speed of the fan and LP shaft or spool could be used to determine the model blade tip clearance targets 270. As yet another example, various stages of rotor blades of the HP or LP turbines could be used to determine the model blade tip clearance targets 270, e.g., HP turbine blades stage one, HPT1; HP turbine blades stage two, HPT2, etc. In yet other examples, various station temperatures and pressures, such as the HP compressor discharge pressure P3 and temperature T3, may be used alone or in combination as suitable parameters to scale or determine the blade tip clearance targets 270. Moreover, the various station temperatures and pressures can be used to create multi-dimensional tables to scale or determine the blade tip clearance targets 270. For example, the blade tip clearances might be scaled as a function of the HP compressor discharge pressure P3 and also of altitude. In some exemplary embodiments, one, all, or a combination of the foregoing can be used to determine the model blade tip clearance targets 270.

Referring again to FIG. 3, HEC model 264 is configured to restrict the acceleration rate of the aircraft 200 during the cruise phase of a flight, among other tasks. In this manner, the risk of the blade tips rubbing against the shrouds during a step climb or other acceleration maneuver is reduced. The HEC model 264 and its control logic may be used in conjunction with the ACC model 262 to prevent rub events. The HEC model 264 can be complimentary to the ACC model 262, but the HEC model 264 is not required.

As further shown in FIG. 3, the aircraft 200 includes a flight management system 220 (FMS) communicatively coupled with the engine controllers 210. FMS 220 provides flight planning and navigation capability and may be communicatively coupled with other avionics and aircraft systems as well, such as e.g., a global positioning system (GPS), VHF omnidirectional range/distance measuring equipment (VOR/DME), Inertial Reference/Navigation Systems (IRS/INS), flight controls, etc. Although not labeled, the FMS 220 includes a flight management computer (FMC), a control display unit (CDU) or multi control display unit (MCDU), and various databases, such as e.g., a navigation database (NDB), an engine/aircraft performance database, etc.

The FMC of the FMS 220 includes various components for performing various operations and functions. The FMC may include those components described for the one or more computing device(s) 211 of engine controllers 210. For example, the FMC can include one or more processor(s) and one or more memory device(s). The one or more memory device(s) can store instructions that when executed by the one or more processor(s) cause the one or more processor(s) to perform the operations and functions.

The CDU of the FMS 220 provides a user interface and means to gather input data from the pilot and to display output data, such as a three-dimensional flight plan. Like the FMC, the CDU can include one or more processor(s) and one or more memory device(s). The one or more memory device(s) can store instructions that when executed by the one or more processor(s) cause the one or more processor(s) to perform the operations and functions, such as e.g., flight planning tasks. The CDU may generate flight plans, interpret incoming data, and automatically adjust the flight plan while the aircraft 100 is airborne.

The NDB contains navigation information stored on a memory device that allows the FMS 220 to generate a flight plan for a particular mission and to update the plan when airborne as needed. The engine/aircraft performance database contains information stored on a memory device that allows the FMS 220 to compute optimal fuel burn, airspeed, altitude, and other performance-based indicators such that the flight plan can be adjusted in favor of a more efficient flight path. For example, the engine/aircraft performance database may contain information to permit the FMC and/or CDU to make decisions as to when a step climb (i.e., an altitude gain during cruise phase) should be performed. The databases may be stored on the same memory device or on separate, dedicated devices. The memory devices may be electrically erasable programmable read-only memory (EEPROM) cards communicatively connected to the FMC, for example.

A pilot may enter waypoints, such as e.g., origin and destination, into the FMC via the CDU to define the flight mission of the aircraft 100. Other operating parameters such as e.g., aircraft gross weight, fuel load, etc. may also be input into the FMC via the CDU. Additionally or alternatively, the CDU may obtain these operating parameters from other aircraft systems or may receive raw sensor data that can be used to calculate or estimate the various operating parameters. Operating parameters can be entered manually by a pilot or automatically via a sensory or data transmission system. The waypoints can likewise be entered manually or automatically. Once the waypoints and the operating parameters of the present flight mission are entered or obtained, the FMC, CDU, or a combination of the two generate a flight plan for the flight mission. The flight plan can be updated as needed during flight. Moreover, the FMC or CDU of the FMS 220 may continue to obtain updated operating parameters during the flight mission such that the flight plan may be altered as needed.

A flight mission is defined as a flight between a particular waypoint to another (i.e., an origin to a destination). For example, a flight from New York, N.Y., USA to Los Angeles, Calif., USA can be considered as one flight mission. Another flight mission can be a flight from Los Angeles to New York. Yet another flight mission can be from Chicago, Ill. USA to Los Angeles. A given aircraft can fly a particular flight mission any number of times.

Referring still to FIG. 3, the aircraft 200 can also include a communication network 230. Communication network 230 can include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the aircraft 200. Such networking environments are commonplace in computer networks, intranets and the internet and may use a wide variety of different communication protocols. It will be appreciated that such network computing environments will typically encompass many types of computer system configuration, including personal computers, hand-held devices, multiprocessor systems, microprocessor-based or programmable consumer electronics, network PCs, minicomputers, mainframe computers, and the like. Moreover, communication network 230 includes communication lines 240 that communicatively couple the various nodes onboard the aircraft 200. For example, as shown in FIG. 3, the communication lines 240 of the communication network 230 operatively couple the engine controllers 210 with the FMS 220. In this way, communications can be sent to and from the engine controllers 210 and FMS 220. Thus, communication network 230 can be a bidirectional communication network. The communication lines 240 of communication network 230 can include a data bus or a combination of wired and/or wireless communication links.

The manner in which blade tip clearance targets are adjusted and utilized to better optimize the blade tip clearances between the blade tips and shrouds will now be described. As noted previously, the blade tip clearances between the blade tips and the shrouds are adjusted by the ACC system. Specifically, engine controllers include adaptive clearance control logic configured to adapt the blade tip clearance targets based at least in part on the way the gas turbine engine has actually or uniquely been operated in the past for a particular flight mission. The adjusted clearance targets can then be utilized to adjust the blade tip clearances accordingly.

Figure 5:
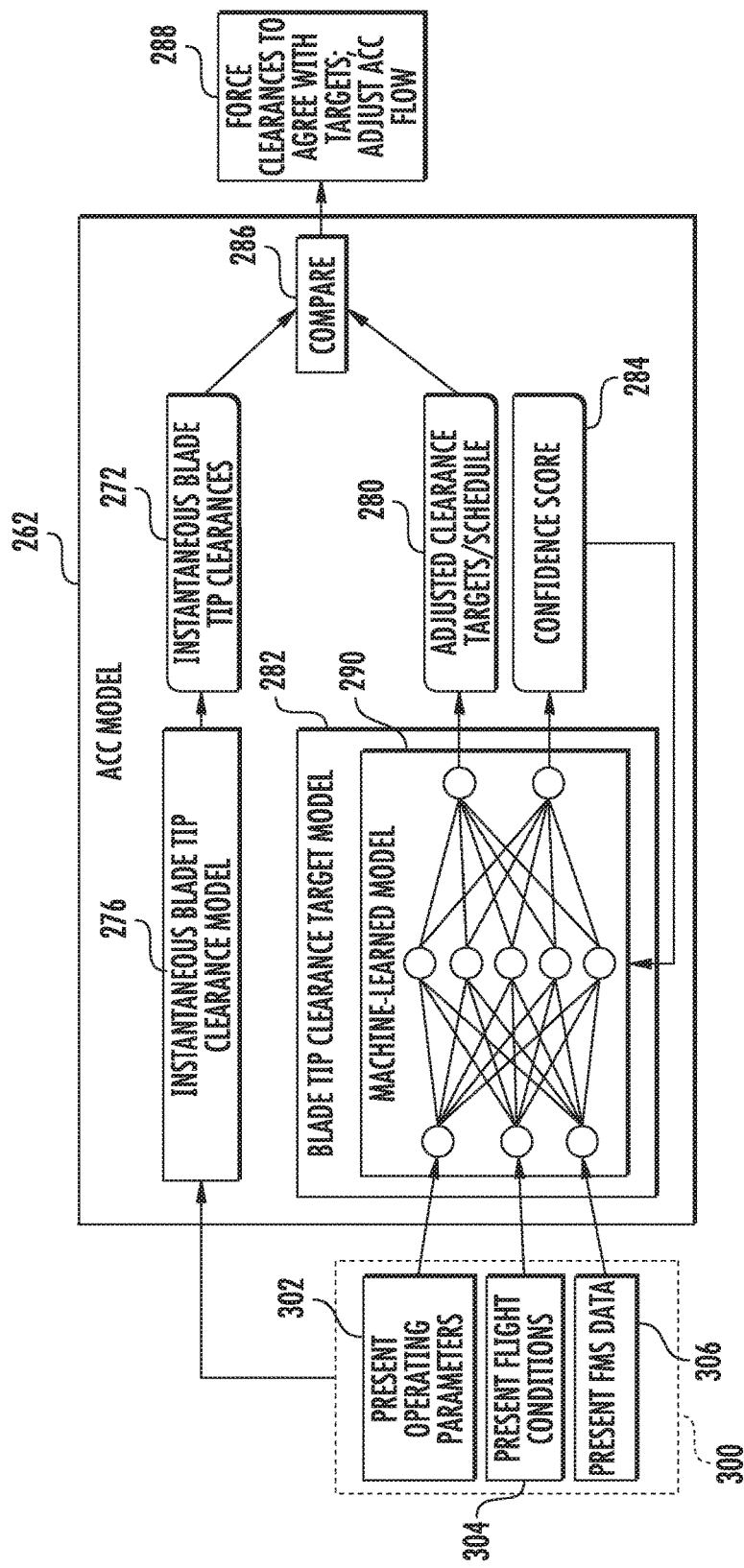
FIG. 5 provides an exemplary flow diagram for adjusting blade tip clearances according to exemplary embodiments of the present disclosure.

FIG. 5 provides an exemplary flow diagram of the ACC model 262 of exemplary engine controller 210 according to exemplary embodiments of the present disclosure. More specifically, a flow diagram depicting how the ACC model 262 utilizes an adjusted clearance target 280 to ultimately adjust the blade tip clearances CL is provided. As shown, exemplary ACC model 262 includes an instantaneous blade tip clearance model 276 and a blade tip clearance target model 282. Each model 276, 282 will be described in turn.

The instantaneous blade tip clearance model 276 obtains various inputs and calculates the instantaneous blade tip clearances 272 between the blade tips and their corresponding shrouds in real time. To do so, the instantaneous blade tip clearance model 276 obtains present flight data 300 indicative of the present operating parameters 302, present flight conditions 304, and present FMS data 306 for the present flight of the flight mission. Stated alternatively, the instantaneous blade tip clearance model 276 obtains various flight data representative of engine operating parameters, flight conditions, and/or FMS data or communications of the flight that is currently in progress or about to be in progress.

Exemplary present operating parameters 302 include but are not limited to sensed, measured, calculated, or predicted temperatures, pressures, speeds, mass flows, thrust, specific fuel consumption (SFC), exhaust gas temperature (EGT), emissions, etc. of the engine. Exemplary present flight conditions 304 include but are not limited to sensed, measured, calculated, or predicted ambient temperatures and pressures, humidity, wind speed, etc. Exemplary present FMS data 306 includes but is not limited to information regarding the proposed or current flight plan, including waypoints such as the origin and destination of the flight and various intermediate waypoints, projected flight path and flight level information, weather information, estimated time in route, as well as various communications from Air Traffic Control (ATC) or the flight crew, for example. Although the present operating parameters 302, present flight conditions 304, and present FMS data 306 each are designated as "present," the term present in this context refers to the present flight currently being flown or about to be flown by an aircraft. Meaning, the present operating parameters 302, present flight conditions 304, and/or present FMS data 306 can be indicative of conditions before a flight and during a flight, and they may be continuously updated over the course of a flight.

Blade tip clearance target model 282 is configured to automatically adjust the model blade tip clearance targets 270 (FIG. 4) based at least in part on the way exemplary engine has been uniquely operated in the past. More specifically, the blade tip clearance target model 282 includes a machine-learned model 290 trained to adjust the model blade tip clearance targets 270 based at least in part on how an engine has been uniquely operated for a particular flight mission. To do so, the blade tip clearance target model 282 obtains present flight data 300, such as present operating parameters 302, present flight conditions 304, and/or present FMS data 306 of the present flight for the given flight mission, and the model 290 generates the adjusted blade tip clearance targets 280.

In some implementations, the outputs generated by the machine-learned model 290 are adjusted blade tip clearance targets 280 for a particular altitude or range of altitudes. In some implementations, the outputs generated by the machine-learned model 290 is an adjusted blade tip clearance control schedule for an entire flight envelope of a flight mission, including adjusted targets for various flight phases, such as takeoff, climb, cruise, descent, approach and land, missed approach, etc. Stated alternatively, the machine-learned model 290 outputs adjusted clearance control targets 280 for the entire time period in which an aircraft is expected to be in the air. In yet other implementations, the outputs generated by the machine-learned model 290 can be a confidence score 284 associated with the generated adjusted blade tip clearance targets 280 (e.g., how confident the machine-learned model 290 is in the adjusted blade tip clearance targets 280). The confidence score 284 can be used, for example, to set a margin of error in setting the adjusted clearance targets 280. For example, the less confident the model is in the adjusted blade tip clearance target 280, the more margin that may be employed when setting the adjusted blade tip target to a predetermined target setting. And conversely, the greater the confidence score 284, the less margin that may be employed when adjusting the clearance target to the predetermined target setting.

The machine-learned model 290 can use any suitable machine learning technique to adjust the clearance targets, including a machine or statistical learning model structured as one of a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, or a combination of one or more of the foregoing. In FIG. 5, for example, a neural network is illustrated as the machine-learned model 290. Other suitable types of machine or statistical learning models are also contemplated. It will also be appreciated that the machine-learned model 290 can use certain mathematical methods alone or in combination with one or more machine or statistical learning models to adjust the clearance targets, such as by using flight profile averages, minimum time at phase, maximum time at phase, etc.

Referring still to FIG. 5, at functional block 286, the calculated instantaneous blade tip clearances 272 are compared to the adjusted blade tip clearance targets 280, and if the calculated instantaneous blade tip clearances 272 do not align with the adjusted targets 280, the calculated clearances 272 are forced to agree with the clearance targets 280 at functional block 288. Specifically, the calculated clearances 272 and targets 280 are forced to agree by the engine controller 210 sending a communication to the ACC system 101 (such as to the control valves 192, 193) to modulate ACC thermal control air 197 to adjust the shrouds relative to the blade tips (FIG. 1).

Figure 6:
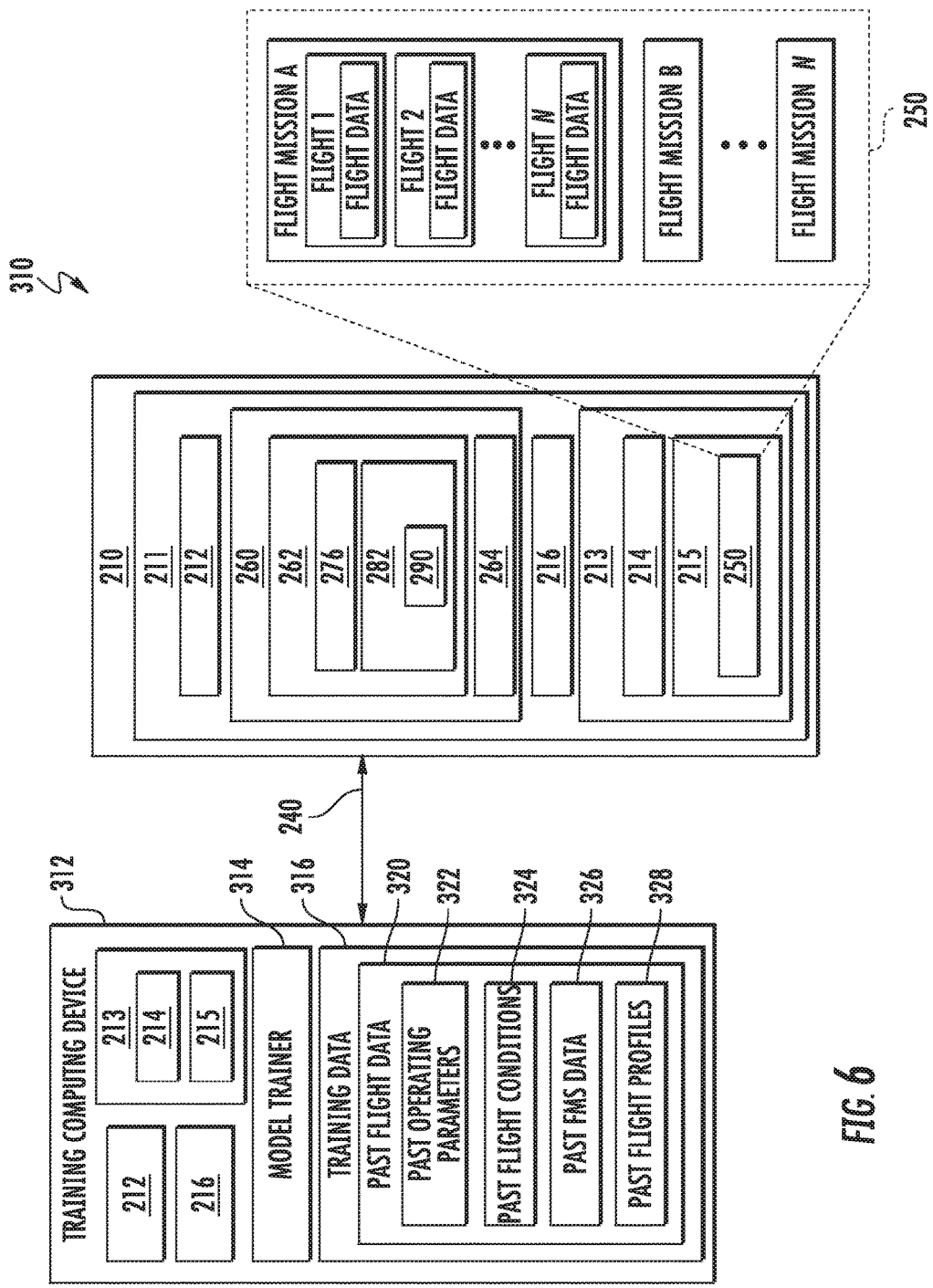
FIG. 6 provides a computing system according to exemplary embodiments of the present disclosure.

In some implementations, the machine-learned model 290 can be trained as follows. FIG. 6 provides a computing system 310 according to exemplary embodiments of the present disclosure. The exemplary computing system 310 illustrated in FIG. 6 is provided as an example only. The components, systems, connections, and/or other aspects illustrated in FIG. 6 are optional and are provided as examples of what is possible, but not required, to implement the present disclosure. The computing system 310 can include one or more engine controller(s) 210 and a training computing device 312 communicatively coupled over one or more communication lines 240, or additionally or alternatively, the engine controller 210 and training computing device 312 can be communicatively coupled over a network via communication network 230 (FIG. 3).

Training computing device 312 can include one or more processor(s) 212 and one or more memory device(s) 213. The one or more memory device(s) 213 can store information accessible by the one or more processor(s) 212, including computer-readable instructions 214 that can be executed by the one or more processor(s) 212. The memory device(s) 213 can further store data 215 that can be accessed by the one or more processor(s) 112. Training computing device 312 can also include a communication interface 216 used to communicate, for example, with one or more engine controllers 210. The hardware, implementation, and functionality of the components of training computing device 312 may operate, function, and include the same or similar components as those described with respect to the one or more computing device(s) 211 of the one or more engine controller(s) 210.

Training computing device 312 can also include a model trainer 314 that trains the machine-learned model 290 using various training or learning techniques, such as, for example, backwards propagation of errors. In some implementations, supervised training techniques can be used on a set of labeled training data. In some implementations, performing backwards propagation of errors can include performing truncated backpropagation through time. The model trainer 314 can perform a number of generalization techniques (e.g., weight decays, dropouts, etc.) to improve the generalization capability of the model being trained.

In some implementations, the model trainer 314 can train the machine-learned model 290 based on a set of training data 316. The training data 316 can include, for example, past flight data 320 indicative of the manner in which the turbine engine has actually and/or uniquely been operated in the past for a particular flight mission. In this way, when the machine-learned model 290 outputs adjusted blade tip clearance targets 280, the clearance targets are customized or tailored for that particular flight mission. The past flight data 320 can include, for example, past operating parameters 322, past flight conditions 324, past FMS data 326, and past flight profiles 328.

By way of example, as shown in FIG. 6, to train the machine-learned model 290 how an engine has been actually and/or uniquely operated in the past for Flight Mission A, past flight data 320 relating to Flight Mission A is obtained from the flight data library 250 or other memory device where the past flight data 320 is stored. For example, additionally or alternatively, the flight data library 250 can be stored as data 215 on one or more memory device(s) 213 of the training computing device 312. The past flight data 320 can be representative of many flights. As illustrated in FIG. 6, the past flight data 320 for Flight Mission A may include flight data for Flight 1, Flight 2, and so on to the Nth Flight. The model 290 can be trained to learn how an engine operates for more than one flight mission. For example, as shown, the model trainer 314 can train the model to learn how the gas turbine engine 100 has been actually and uniquely operated with respect to Flight Mission B, and so on up to the Nth Flight Mission. A portion of the past flight data 320 can be used as training data 316, as shown, and other portions of the past flight data 320 can be used for test/validation data sets to test and/or validate the model. It will be appreciated that the model trainer 314 can process or pre-process the past flight data 320 generally and the past flight profiles 328 more specifically such that outlier flights, or those flights that are significantly different than a vast majority of other past flight profiles 328, can be disregarded and not used to train, test, and/or validate the machine-learned model 290.

In some implementations, the model trainer 314 can train the model 290 using training data 316 that includes past flight profiles 328. The past flight profiles 328 can be those stored as data 215 in the flight data library 250 of the one or more memory device(s) 213 of the one or more computing device(s) 211 of the engine controller 210. Generally, a past flight profile 328 is representative of an aircraft's altitude over the course of a flight. Moreover, as described more fully below, past flight profiles 328 may also be representative of an aircraft's time at flight phase, time at stable periods of the flight, time at flight phase prior to an expected aircraft maneuver, and time at flight phase prior to a transition phase.

The past flight profiles 328 can be categorized by flight mission, e.g., such as by Flight Mission A, Flight Mission B, Flight Mission C, and so on and so forth for any number of particular flight missions. There could be any number of past flight profiles 328 associated with a particular flight mission. For instance, Flight Mission A might include thousands of past flight profiles 328 indicative of the manner in which the turbine engine 100 has been operated in the past for Flight Mission A; Flight Mission B might include thousands of past flight profiles 328 indicative of the manner in which the turbine engine 100 has been operated in the past for Flight Mission B; Flight Mission C might include a few hundred past flight profiles 328 indicative of the manner in which the turbine engine 100 has been operated in the past for Flight Mission C; Flight Mission D might include twenty (20) past flight profiles 328 indicative of the manner in which the turbine engine 100 has been operated in the past for Flight Mission D; and Flight Mission E might include five (5) past flight profiles 328 indicative of the manner in which the turbine engine 100 has been operated in the past for Flight Mission E.

Figure 7:
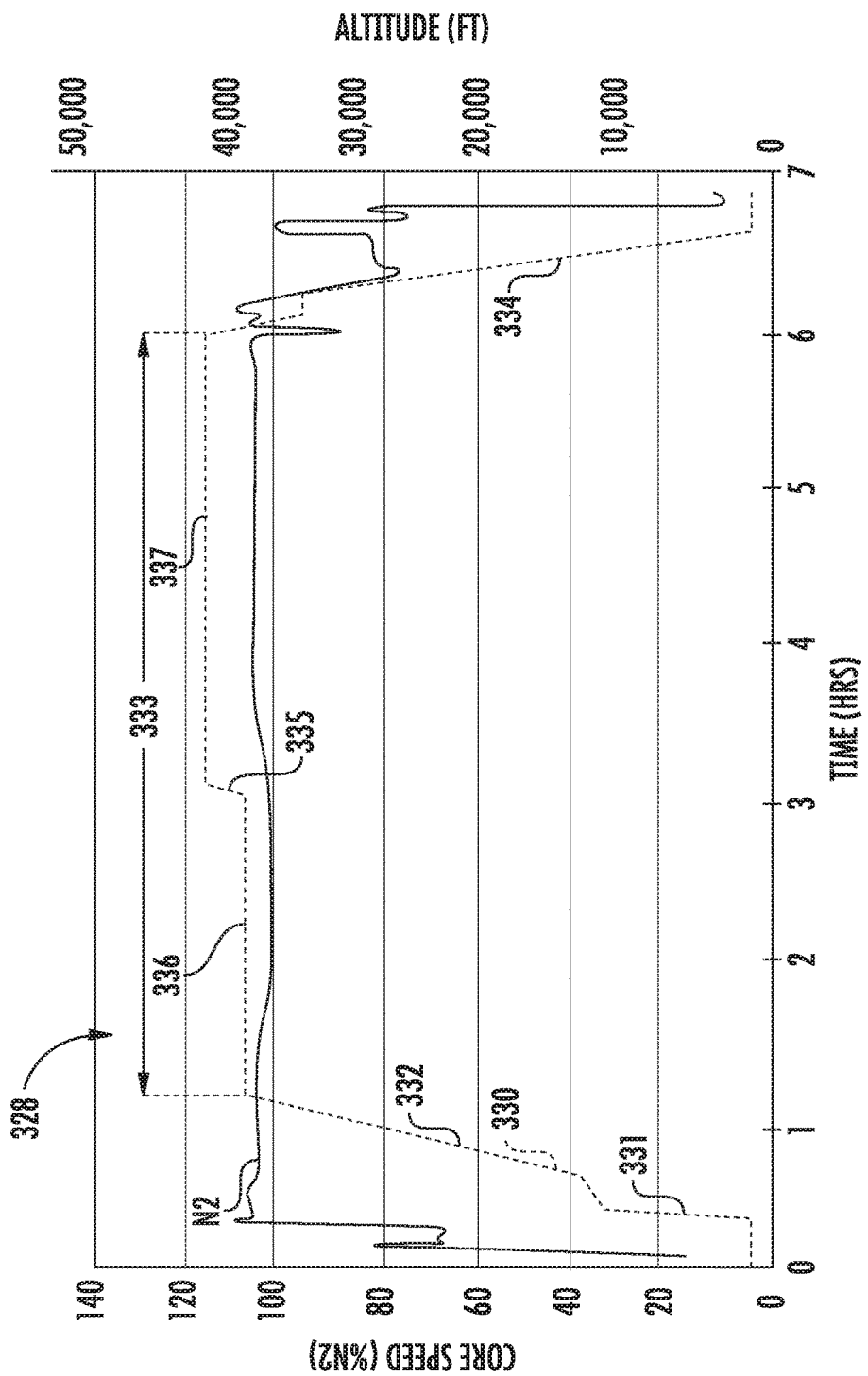
FIG. 7 provides a plot of core speed and altitude as a function of time for an exemplary flight according to exemplary embodiments of the present disclosure.

In some implementations, past flight profiles 328 can be indicative of a time at flight phase. More specifically, each past flight profile 328 can include a profile of the altitude of the aircraft over the course of a flight of a particular flight mission. FIG. 7 provides an exemplary past flight profile 328 for a past flight of a flight mission. More specifically, FIG. 7 depicts a plot of the altitude (feet) of the aircraft and core speed (% N2) of one of its gas turbine engines as a function of time (hours) according to exemplary embodiments of the present disclosure. The flight profile 328 represents the aircraft's altitude 330 over the course of the flight. Also depicted is the core speed N2 of one of the gas turbine engines of an aircraft over the course of the flight. The core speed N2 is a past operating parameter 322. The past flight profile 328 is indicative of the manner in which the aircraft was flown during the flight mission and the past operating parameter 322 (i.e., the core speed N2) is indicative of the manner in which the turbine engine was operated during the flight mission. It will be appreciated that other suitable past operating parameters 322, past flight conditions 324, and past FMS data 326 can be stored as past flight data 320 as well may provide context to the past flight profiles 328, including e.g., gross aircraft weight as a function of time, fuel load as a function of time, thrust ratings as a function of time or phase, ambient conditions as a function of time, such as e.g., temperature, pressure, etc.

As the past flight profile 328 in FIG. 7 illustrates, the flight included various flight phases, including a takeoff phase 331, a climb phase 332, a cruise phase 333, and a descent phase 334. It will be appreciated that each flight phase could be segmented or broken down further. For example, the descent phase 334 could include an initial descent phase and an approach and land phase. At the three (3) hours mark of the flight, the aircraft performed a step climb 335, or an altitude gain made in cruise phase 333. As an aircraft decreases in weight during flight, step climbs may be performed to move the aircraft into thinner air to optimize fuel economy, among other reasons. The cruise phase 333 can be broken down into segments, including a first cruise phase 336 (i.e., the segment preceding the step climb 335) and a second cruise phase 337 (i.e., the segment subsequent to the step climb 335).

As noted above, in some implementations, the past flight profile 328 can be indicative of a time at flight phase. For this embodiment, the time at the takeoff phase 331 was relatively quick, lasting only a matter of minutes. The time at climb phase 332 lasted between about twenty (20) to thirty (30) minutes. The time at cruise phase 333 lasted about a total of five (5) hours from about hour one (1) to about hour six (6) of the flight. During the cruise phase 333, step climb 335 was performed about three (3) hours into the flight. Thus, the time at the first cruise phase 336 was about two (2) hours and the time at the second cruise phase 337 was about three (3) hours. At hour six (6), the aircraft transitioned from the cruise phase 333 to the descent phase 334. The time at descent phase 334 was about forty (40) minutes. Based on the past flight profile 328, and more specifically on the times at the various flight phases, the model trainer 314 can train the machine-learned model 290 to learn how the gas turbine engine is operated for this particular flight mission.

Figure 8:
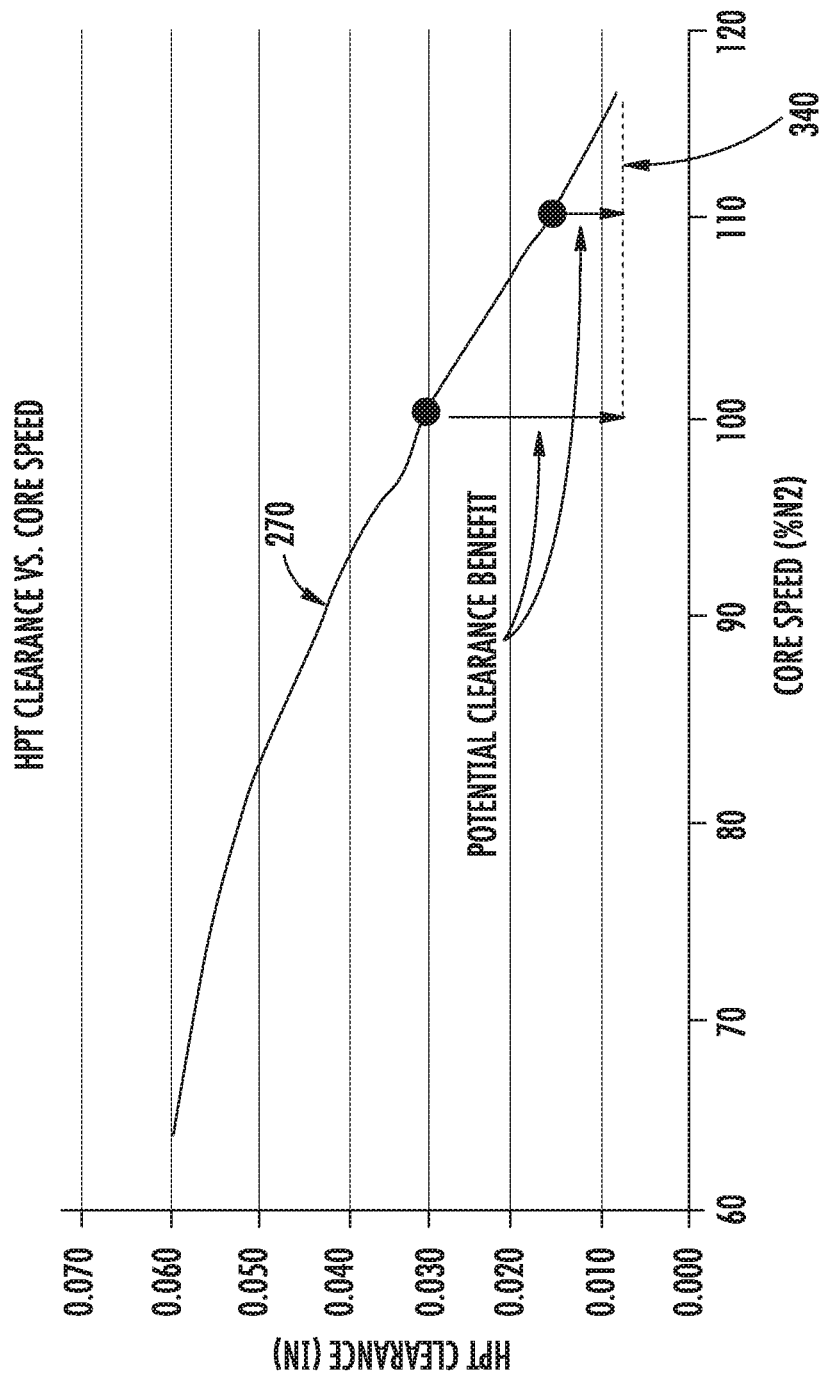
FIG. 8 provides a plot of model blade tip clearance targets as a function of core speed according to exemplary embodiments of the present disclosure.

When the machine-learned model 290 learns how an engine is uniquely operated for a particular flight mission, the machine-learned model 290 can output an adjusted blade tip clearance target 280 or schedule of targets that are valid for certain altitude ranges. By way of example, consider the cruise phase 333 depicted in FIG. 7. The altitude 330 of the aircraft was approximately 38,000 feet prior to the step climb 335 and approximately 42,000 feet after the step climb 335. Thus, the step climb 335 was an altitude gain of four thousand (4,000) feet. Moreover, during the cruise phase 333, the core speed N2 was maintained between about one hundred (100) and about one hundred ten (110) percent of N2. FIG. 8 provides a model blade tip clearance target 270 valid for this altitude and core speed range.

More specifically, FIG. 8 provides an exemplary plot of the model blade tip clearance target 270 (inches) of the HP turbine of the gas turbine engine as a function of core speed (% N2) according to exemplary embodiments of the present disclosure. As noted previously, clearance targets are typically set so that an accel can be completed from a particular speed of the engine to a maximum continuous speed. In the case of the aircraft at cruise phase 333, this means that the blade tip clearances CL are controlled to a distance such that a step climb can be performed at any point in time.

As shown in FIG. 8, assuming the clearance target is valid for altitudes between 38,000 feet and 42,000 feet, the target blade tip clearance would be set between the blade tips and shrouds at about 0.030 inches at a core speed of 100% N2 and at about 0.015 inches at a core speed of 110% N2. Depending on the core speed N2, the ACC system would force the blade tip clearances CL to agree with the model blade tip clearance target 270 such that the blade tip clearances are set between about 0.030 and 0.015 inches. The minimum clearance 340 for this particular exemplary engine design is 0.008 inches. The minimum clearance 340 is the sum of rotor vibrations, operational and assembly out of roundness (distortion), and clearance closure that is encountered as the engine(s) attempt to maintain a particular Mach number/speed. It will be appreciated that other engine designs may have different minimal clearances and that the minimal clearance noted above is exemplary only. It will also be appreciated that the minimal clearance may be different at certain engine speeds, altitudes, flight conditions, etc.

When the core speed N2 is at 100% N2, the difference between the clearance target 270 and the minimum clearance 340 is 0.022 inches (0.030 inches–0.008 inches=0.022 inches). When the core speed N2 is at 110% N2, the difference between the model clearance target 270 and the minimum clearance 340 is 0.007 inches (0.015 inches–0.008 inches=0.007 inches). As this flight mission only includes one step climb 335 performed approximately three (3) hours into the flight as shown in FIG. 7, the blade tip clearances were set unnecessarily open by the FADEC engine controllers 210 for about two (2) hours during the first cruise phase 336 before the step climb 335 and for about three (3) hours during the second cruise phase 337 after the step climb 335. Specifically, when the core speed was set around 100% N2 during the cruise phase 333, there was a potential clearance benefit of 0.022 inches, and when the core speed was set around 110% N2 during the cruise phase 333, there was a potential clearance benefit of 0.007 inches. If it is known that the turbine engine is going to be operated in a particular way for the flight mission, the machine-learned model 290 can be trained to adjust the model blade tip clearance targets 270 to better optimize the blade tip clearances.

Figure 9:
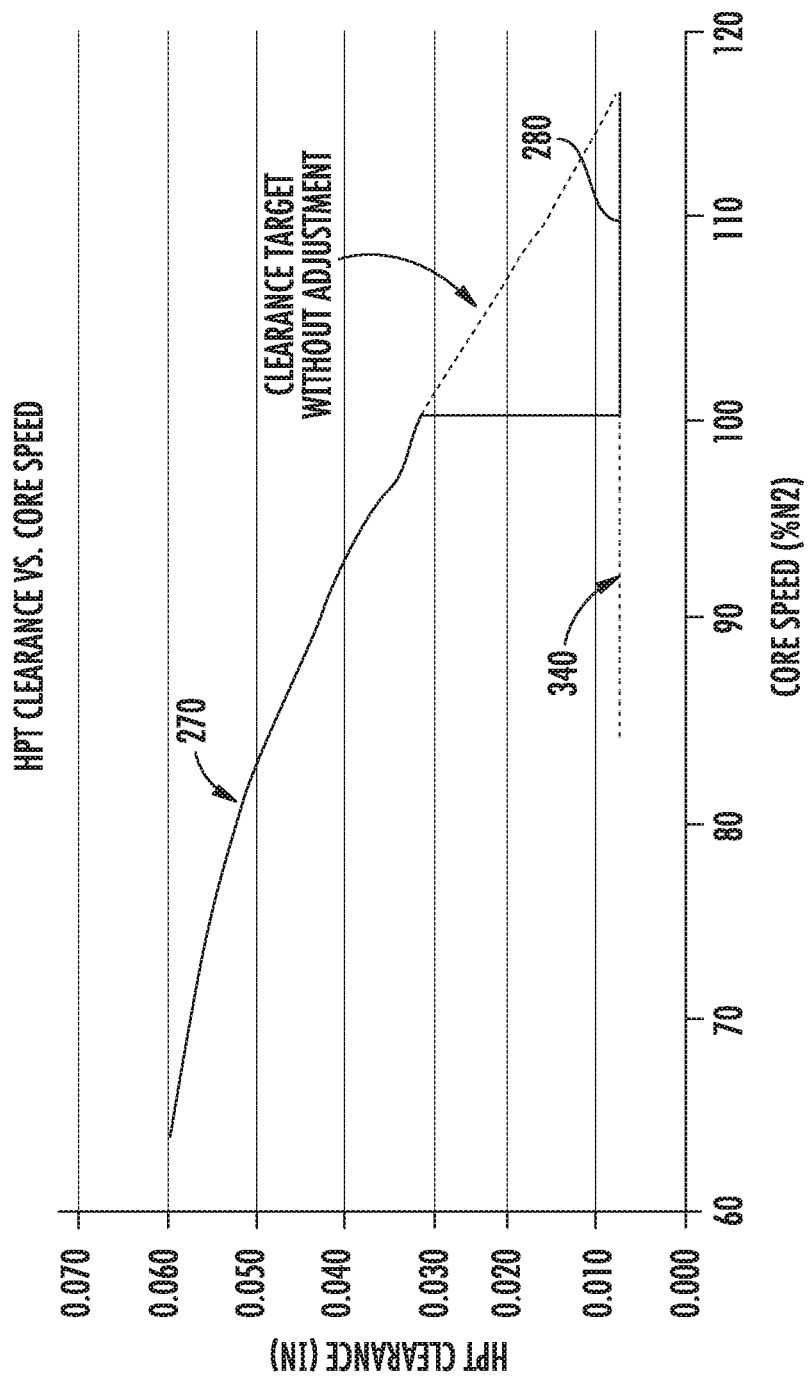
FIG. 9 provides a plot of adjusted blade tip clearance targets as a function of core speed according to exemplary embodiments of the present disclosure.

With reference to FIGS. 7 and 9, FIG. 9 provides an exemplary plot of adjusted blade tip clearance target 280 (inches) as a function of core speed (% N2) according to exemplary embodiments of the present disclosure. Continuing with the example of FIG. 7 from above, and assuming that the aircraft has just transitioned from the climb phase 332 to the cruise phase 333 at hour one (1) of the flight, the model blade tip clearance target 270 can be adjusted as follows. Based on the past flight profile 328, it is known that a step climb 335 is expected or anticipated at about hour three (3) of the flight. Based on this knowledge, the model blade tip clearance target 270 can be adjusted by the machine-learned model 290. In particular, for approximately the first two (2) hours during the first cruise phase 336, the model blade tip clearance target 270 can be adjusted to a predetermined target setting, which in this embodiment is the minimum clearance 340 of 0.008 inches for the core speeds N2 of 100% N2 and 110% N2 as shown in FIG. 9. As shown, the adjusted blade tip clearance target 280 can be flat lined along the minimum clearance 340 for core speeds between 100% N2 and 110% N2. Then, at hour three (3) of the flight, the adjusted blade tip clearance target 280 can be adjusted or can revert back to the model blade tip clearance target 270 shown in FIG. 8 such that the step climb 335 can be performed without significant risk of a rub event. In other words, the clearances can be set more open to accommodate power level changes performed by the gas turbine engine during the step climb 335.

After the step climb 335 and for the duration of the second cruise phase 337, the model blade tip clearance target 270 can be adjusted once again back to the predetermined target setting as shown in FIG. 9 (i.e., the blade tip clearances CL can be adjusted back to the minimum clearance 340). As no further step climbs 255 are expected or anticipated after the step climb 335 is performed at hour three (3) of the flight, the target clearances can remain adjusted until transitioning to the descent phase 334 at hour six (6). In this way, engine performance and efficiency can be better optimized.

Figure 10:
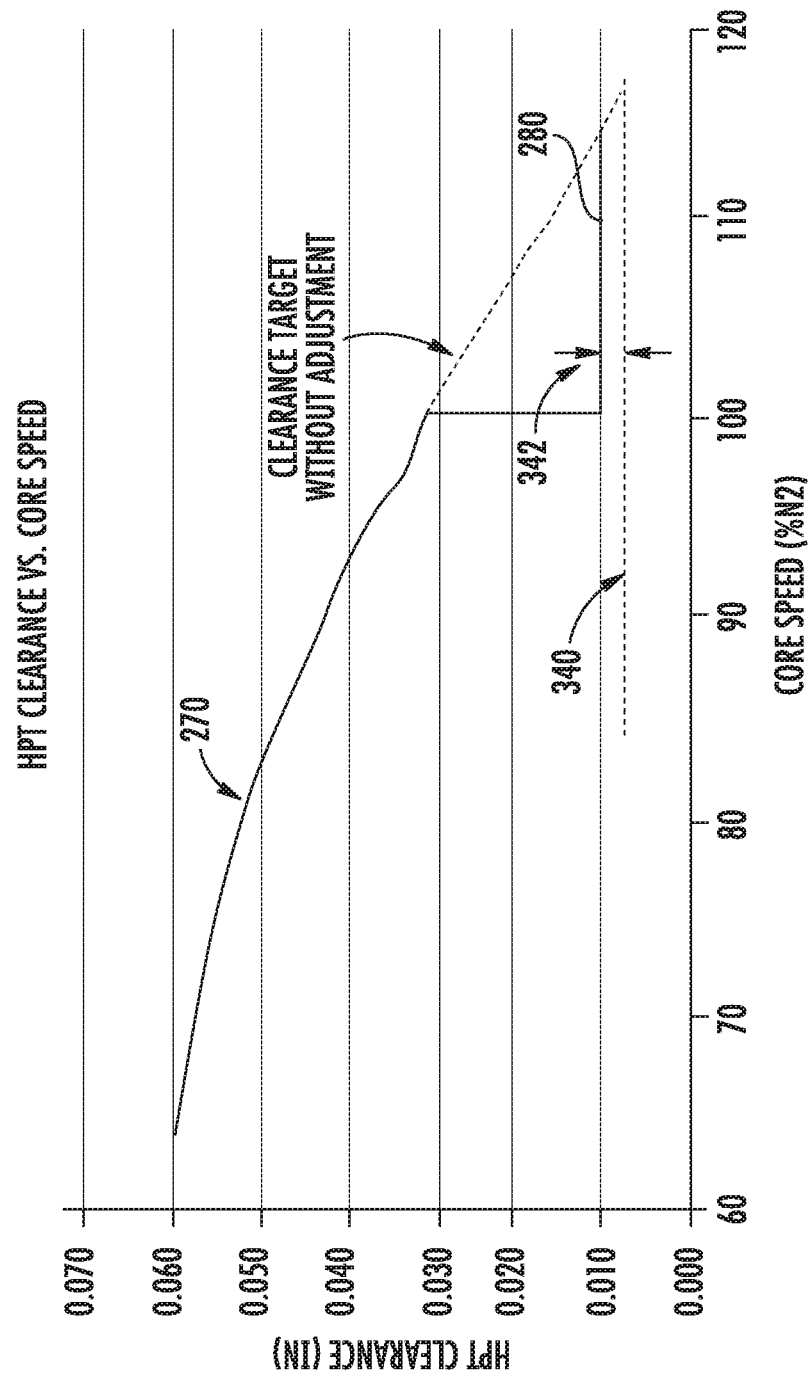
FIG. 10 provides another plot of adjusted blade tip clearance targets as a function of core speed according to exemplary embodiments of the present disclosure.

In some exemplary implementations, as shown in FIG. 10, the blade tip clearance target can be adjusted to a predetermined target setting that is within a margin 342 of the minimum clearance setting 340. FIG. 10 provides an exemplary plot of adjusted blade tip clearance target 280 (inches) as a function of core speed (% N2) according to exemplary embodiments of the present disclosure. Specifically, the adjusted blade tip clearance target 280 is shown set at a predetermined target setting, which in this embodiment is a setting that is within a margin 342 of the minimum clearance 340. As shown, instead of the adjusted blade tip clearance target 280 being set at 0.008 inches (i.e., the minimum clearance 340 in this example), the adjusted blade tip clearance target 280 can be set at or within a 25% margin of the minimum clearance 340, which in this embodiment would be at 0.010 inches as shown. In other exemplary embodiments, the blade tip clearance target 270 can be set at a predetermined target setting that is at or within a 12.5% margin of the minimum clearance 340, which would be at 0.009 inches if the minimum clearance 340 is 0.008, at or within a 50% margin of the minimum clearance 340, which would be at 0.012 inches if the minimum clearance 340 is 0.008, at or within a 100% margin of the minimum clearance 340, which would be at 0.016 inches if the minimum clearance 340 is 0.008, or at or within a 150% margin of the minimum clearance 340, which would be at 0.020 inches if the minimum clearance 340 is 0.008, for example.

Setting the blade tip clearance target 280 at or within a margin 342 with respect to the minimum clearance 340 allows for a margin of error and may help avoid rub events. The margin may be adjustable. In some exemplary implementations, for example, the margin 342 can be adjusted based on the confidence score 284 generated or outputted by the machined-learned model 290. As shown in FIG. 5, the confidence score 284 can be looped back into the machined-learned model 290 and can be used to adjust one or more of the weights or inputs of the machine-learned model 290 such that the margin 342 can be set appropriately. For example, the confidence scores 284 can be outputted as a number between one (1) and ten (10) with ten (10) being a confident score and one (1) being a less confident score. If the confidence score 284 is between one (1) and four (4), the margin 342 can be set at or within a 50% margin of the minimum clearance 340; if the confidence score 284 is between five (5) and eight (8), the margin 342 can be set at or within a 25% margin of the minimum clearance 340; and if the confidence score 284 is between nine (9) and ten (10), the margin 342 can be set at or within a 12.5% margin of the minimum clearance 340.

In yet another exemplary implementation, if a particular flight mission has a significant flight history of past flight profiles 328, a smaller margin 342 could be used as more data is available for that particular flight mission, and conversely, if the flight history for the particular mission is not significant and there are not many past flight profiles 328 available, the margin 342 could be increased to account for the uncertainty. The margin could be slowly decreased as more past flight profiles 328 become available.

In some implementations, where the blade tip clearances CL are adjusted tighter or more closed, the HEC model 264 can work in conjunction with the ACC model 262 to ensure that the risk of rub events is minimized. By way of example, when an aircraft is expected to maintain a relatively stable altitude, such as during the first cruise phase 336 before the step climb 335 and second cruise phase 337 after the step climb 335 in the example of FIG. 7, the HEC control logic can restrict the rate of acceleration of the aircraft 200 such that a rub event does not occur if an unexpected power level change is performed. And when an expected maneuver is anticipated, such as e.g., a step climb, the ACC model 264 may adjust the model clearance targets 270 such that the blade tip clearances CL are set more open. At the same time, the HEC control logic can be either shut off or configured to allow for quicker rates of acceleration of the aircraft. This would allow a pilot to perform a step climb maneuver at a much faster rate without worrying about a significant risk of a rub event. After the expected maneuver is performed, the HEC model 264 can once again restrict the rate of acceleration to protect against rub events, and at the same time, the ACC model 262 can communicate with the ACC system 101 to retighten or close the blade tip clearances CL.

Figure 11:
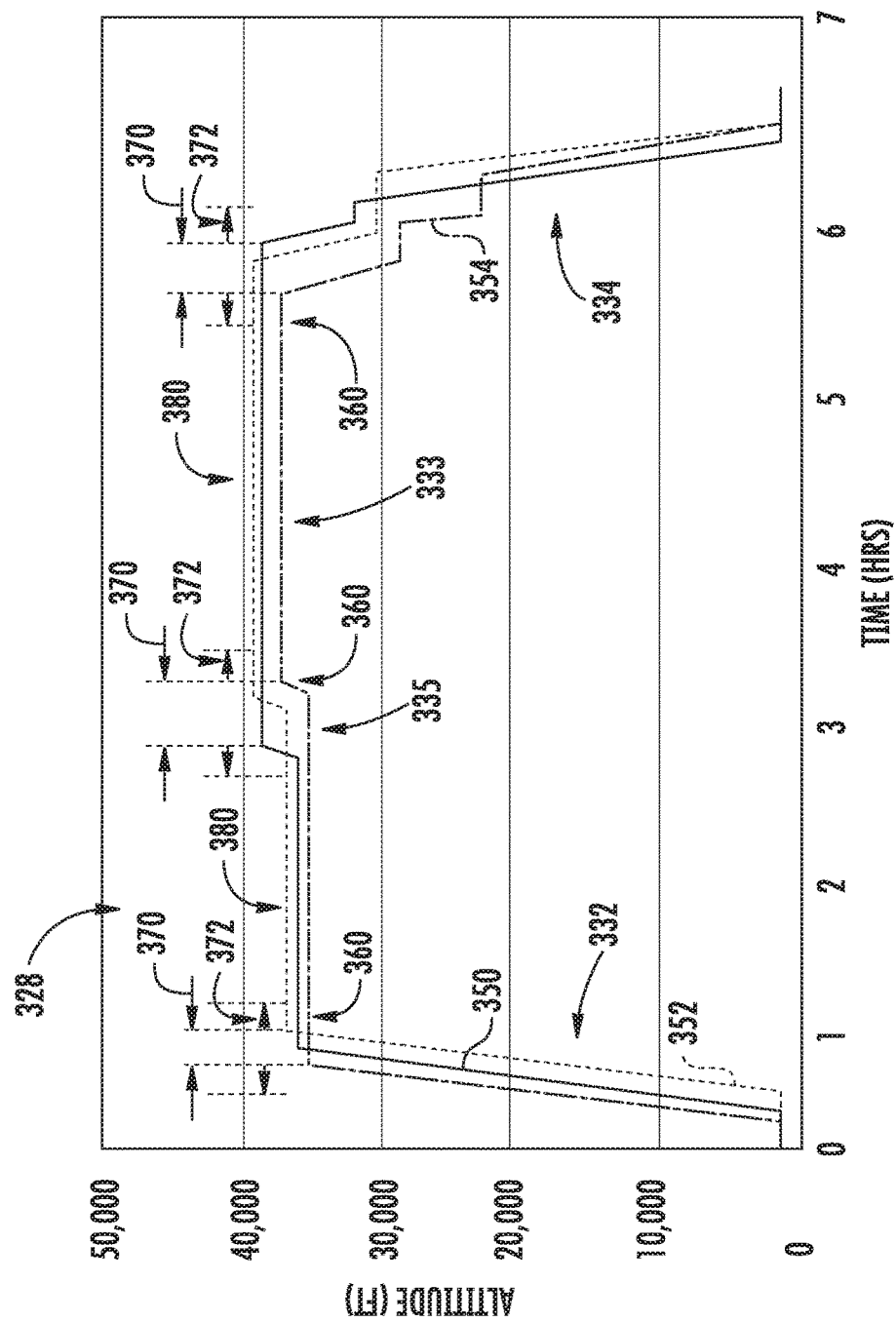
FIG. 11 provides a plot of various past flight profiles for a flight mission according to exemplary embodiments of the present disclosure.

It will be appreciated that not all past flight profiles 328 are the same for a particular flight mission. For example, an aircraft may fly from New York to Los Angeles (i.e., the flight mission) routinely, but that the time at certain flight phases may vary. By way of example, FIG. 11 provides an exemplary plot of various past flight profiles 328 for a flight mission according to exemplary embodiments of the present disclosure. Specifically, the plot depicts the altitude (feet) as a function of time (hours) for various past flight profiles 328. As shown, the flight profiles 378 include a first flight profile 350, a second flight profile 352, and a third flight profile 354. It will be appreciated that while three flight profiles are shown in FIG. 11, there could any number of past flight profiles 328 indicative of the manner in which the turbine engine 100 was operated in the past for the particular flight mission. For instance, there could be hundreds or thousands of past flight profiles 328 associated with a particular flight mission.

For each of the flight profiles 350, 352, 354, the aircraft transitioned from the climb phase 332 to the cruise phase 333 about one (1) hour into the flight. Thus, based on the past flight profiles 328 and assuming the sample size is adequate, the aircraft can be said to routinely transition from the climb phase 332 to cruise phase 333 at about the one (1) hour mark into the flight. The transition from the climb phase 332 to the cruise phase 333 may be deemed an expected maneuver 360. For this flight mission, the expected maneuver 360 (i.e., the transition from climb to cruise) is expected to take place within a transition period 370, which is about the one (1) hour mark of the flight. The transition period 370 may be a period of time spanning from a first point in time in which an expected maneuver 360 is expected to be performed to a last point in time in which an expected maneuver 360 is expected to be finished being performed. In this way, the clearance targets may be opened as needed to allow for the gas turbine engine to perform the expected maneuver 360.

As expected maneuvers 360 might be performed at different points in time of a particular flight mission, a transition period 370 can include transition margins 372 on both sides of the transition period 370. For example, the transition period 370 can have a transition margin 372 of twenty (20) minutes can be added to both side of the transition period 370 as shown in FIG. 11. In other embodiments, the transition margin 372 can extend the transition period 370 by at least about five percent (5%), by at least about ten percent (10%), by at least about fifteen percent (15%), or by at least about twenty percent (20%).

Between the transition period 370 where the aircraft transitioned from the climb phase 332 to the cruise phase 333 and the step climb 335 performed at about the three (3) hour mark into the various flights, a stable period 380 is shown where the aircraft maintains a relatively stable altitude. Although the core speed N2 (not shown) can fluctuate during this period, the core speed N2 does not fluctuate drastically. Thus, this may be deemed a stable period 380. The machined-learned model 290 can be trained to adjust the model blade tip clearance targets 270 to the minimum clearances 340 in this period (FIG. 9), or at least within a margin 342 of the minimum clearance 340 (FIG. 10).

After the stable period 380, for each of the flight profiles 350, 352, 354, the aircraft performed a step climb 335 at cruise phase 333 approximately three (3) hours into the flight. For the first profile 350, the aircraft performed a step climb 335 approximately three (3) hours into the flight. For the second and third flight profiles 352, 354, the aircraft performed step climbs 335 just after three (3) hours into the flight. Although the aircraft performed step climbs 335 at different points in time during the flight mission, the step climbs 335 were performed generally around the three (3) hour mark of their respective flights. Thus, for this particular flight mission and assuming the sample size is valid, the aircraft can be said to routinely perform a step climb 335 at about the three (3) hour mark of the flight. The aircraft's pattern of performing step climbs 255 at about the three (3) hour mark may be designated as a likely or expected maneuver 360. For this flight mission, the expected maneuver 360 (i.e., the step climb 335) is expected to take place within a transition period 370, which is at about the three (3) hour mark of the flight. During the transition period 370, the machine-learned model 290 can be trained to adjust the adjusted blade tip clearance targets 280 back to the model blade tip clearance targets 270 as shown in FIG. 8 such that power level changes can be made without significant risk of a rub event. Like the transition period 370 where the aircraft transitions from climb to cruise, the transition period 370 associated with the step climb 335 may also include a transition margin 372 on either side of the transition period 370 as shown in FIG. 11.

After the step climb 335, another stable period 380 extends for about (3) hours until about the six (6) hour mark of the flight. In the stable period 380, the aircraft maintains a relatively stable altitude and relatively stable core speed N2. The machined-learned model 290 can be trained to adjust the model blade tip clearance targets 270 to the predetermined target setting during this stable period, such as e.g., to the minimum clearances 340 (FIG. 9), or to or at least within a margin 342 of the minimum clearance 340 (FIG. 10).

For each of the flight profiles 350, 352, 354, the aircraft transitioned from the stable period 380 of the cruise phase 333 to the descent phase 334 about six (6) hours into the flight. Thus, based on the past flight profiles 328 for this particular flight mission and assuming the sample size is adequate, the aircraft can be said to routinely transition from the cruise phase 333 to climb phase 334 at about the six (6) hour mark into the flight. The transition from the cruise phase 333 to climb phase 334 may be deemed an expected maneuver 360. For this flight mission, the expected maneuver 360 (i.e., the transition from cruise to descent) is expected to take place within a transition period 370, which is about the six (6) hour mark of the flight. Like the other transition periods 392, the transition period 370 from cruise to descent can likewise include a transition margin 372 on either side of the transition period 370. During the transition period 370, the machine-learned model 290 can be trained to adjust the adjusted blade tip clearance targets 280 back to the model blade tip clearance targets 270 as shown in FIG. 8 such that power level changes made during the transition to the descent phase 334 can be made without significant risk of a rub event.

As shown in FIG. 11, the machine-learned model can be trained to adjust blade tip clearance targets based on the way an engine is actually and/or uniquely operated for a particular flight mission. More specifically, the past flight data 320 can include many past flight profiles 328 that are used to train the machine-learned model 290 how the engines are operated during particular flight missions. The machine-learned model 290 can be configured to learn when an engine is expected to be operating in a stable period 380 and when the engine is expected to be operated in a transition period 370 and thus can generate clearance targets accordingly.

In some implementations, a rolling average of the one or more past flight profiles 328 can be used to train or continuously train the machine-learned model 290 how an engine is actually and/or uniquely operated for a particular flight mission. In this way, as situations and circumstances change, the machine-learned model 290 can be kept updated and current. In other implementations, the average of a predetermined number of the most current flights can be used to train or continuously train the machine-learned model 290 how an engine is actually and/or uniquely operated for a particular flight mission. For example, the predetermined number of the most current flights can be 100 flights.

Referring once again to FIG. 6, in some implementations, additionally or alternatively, the model trainer 314 can train the machine-learned model 290 using past flight data 320 that includes past operating parameters 322. Past operating parameters 322 are representative of the manner in which the gas turbine 100 has been operated for a particular flight mission. That is, each flight flown for the particular flight mission may have certain operating parameters representative of the manner in which the engine was operated for that particular flight.

The past operating parameters 322 can include but are not limited to one or more of: fan speed over the course of the flight or over a particular flight phase, a core speed over the course of the flight or over a particular flight phase, a thrust rating over the course of the flight or over a particular flight phase, a gross weight of the aircraft over the course of the flight or over a particular flight phase, a fuel load of the aircraft over the course of the flight or over a particular flight phase, as well as engine temperatures, pressures, speeds, mass flows, SFC, EGT, emissions, etc. over the course of the flight, during a particular flight phase, or at certain altitudes. The memory device(s) 213 of one or more of the computing device(s) 211 of the engine controllers 210 or other computing devices communicatively coupled to the engine controller 210 may store the past operating parameters 322. For example, the past operating parameters 322 can be stored in the flight data library 250 such that the data can be obtained and input into the model trainer 314 to train, test, or validate the machine-learned model 290.

Past operating parameters 322 provide context and insight as to how an engine has been operated for a given flight of a particular flight mission. By way of example, the aircraft flying a given flight for a flight mission may have a gross aircraft weight. As the aircraft performs the flight mission, the gross weight of the aircraft will decrease as fuel is burned. The gross weight of the aircraft over the course of the flight can be tracked and stored in the flight data library 250, for example. This information can be used to assess why the aircraft flew at a particular altitude or performed a step climb at a particular point during the flight. In other words, the past operating parameters 322 may provide context to the past flight profiles 328. In this way, the machine-learned model 290 can be trained to be a more accurate representation of the manner in which the engine has been flown in the past.

In some implementations, the model trainer 314 can train the model using past flight data 320 that includes past flight conditions 324. The past flight conditions 324 can include but are not limited to: sensed, measured, calculated, or predicted ambient temperatures and pressures, humidity, wind speed, etc. over the course of the flight, during a particular flight phase, or at certain altitudes. Like the past operating parameters 322, the past flight conditions 324 may provide context to the past flight profiles 328 and may provide for a model 290 that more accurately adjusts clearance targets.

In some implementations, the model trainer 314 can train the model using past flight data 320 that includes past FMS data 326. During flight, the FMS 220 may obtain and generate certain information, and based on that information, the FMS 220, in conjunction with pilot or autopilot input, may cause the aircraft 220 to fly a particular route or to deviate therefrom. For example, if inclement weather is reported within the proposed flight plan of the aircraft, the aircraft may deviate from the initial flight plan. This information may assist the model trainer in determining that such a flight is an outlier from more traditional flight patterns for the particular flight mission. Past FMS data 326 may include but is not limited to: proposed flight plans prior to takeoff and information relating to how and why the flight plan was deviated from during flight, waypoints entered, such as the origin and destination of the flight and various intermediate waypoints, flight level information, weather information, estimated time in route, as well as various communications from, for example, Air Traffic Control (ATC) or the flight crew. Like the past operating parameters 322 and past flight conditions 324, the past FMS data 326 may provide context to the past flight profiles 328 and may provide for a model 290 that more accurately adjusts clearance targets.

Once the training data 316 made up at least in part by past flight data 320 is obtained and is input into the model trainer 314, test/validation data can be used to test or validate the model. The test/validation data can be made up of past flight data 320 as well. Once the machine-learned model 290 is trained, present flight data 300 can be input into the model, and as an output, the machine-learned model 290 can generate a custom or adjusted clearance target 280 or schedule of targets that can be used to better optimize the blade tip clearances CL of the gas turbine engine based at least in part on the way the engine 100 has been actually and uniquely flown for particular flight missions.

Figure 12:
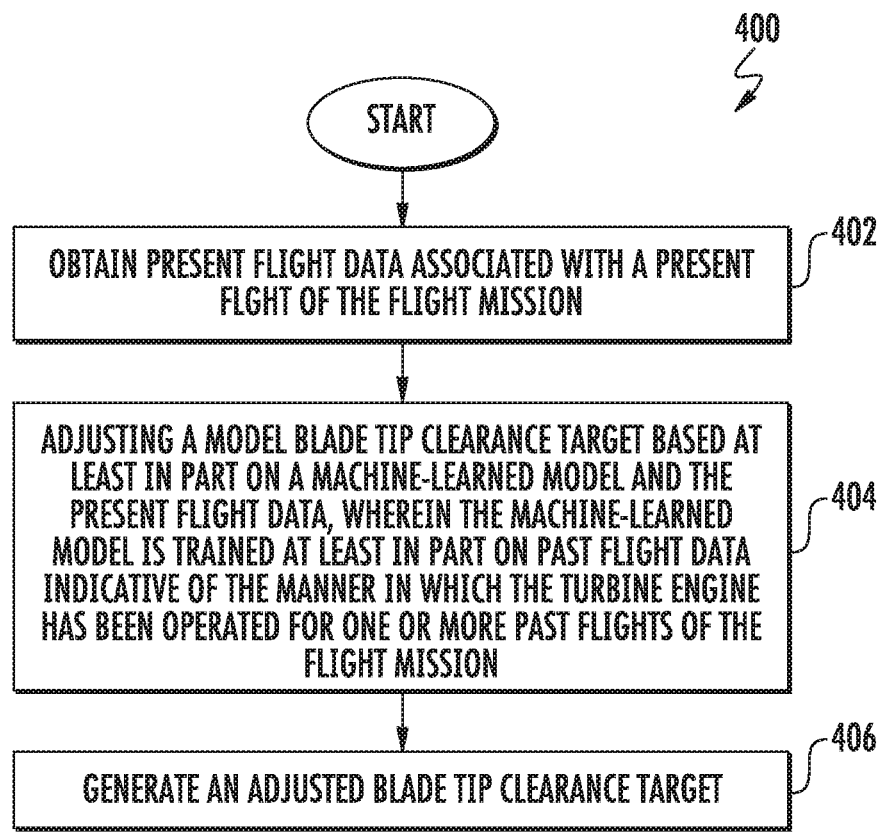
FIG. 12 provides a flow diagram of an exemplary method for adjusting blade tip clearance targets according to exemplary embodiments of the present disclosure.

FIG. 12 depicts a flow diagram of an exemplary method (400) for adjusting a blade tip clearance target according to exemplary embodiments of the present disclosure. Some or all of the method (400) can be implemented by one or engine controllers 210 described herein. Some or all of the method (400) can be performed onboard the aircraft 200 and while the aircraft 200 is in operation, such as when an aircraft 200 is in flight. Alternatively, some or all of the method (400) can be performed while the aircraft 200 is not in operation and/or off board of the aircraft 200. In addition, FIG. 12 depicts method (400) in a particular order for purposes of illustration and discussion. It will be appreciated that exemplary method (400) can be modified, adapted, expanded, rearranged and/or omitted in various ways without deviating from the scope of the present subject matter.

At (402), exemplary method (400) for adjusting the blade tip clearance target of the turbine engine 100 for a particular flight mission includes obtaining, by one or more engine controllers 210, present flight data 300 associated with a present flight of the flight mission. For example, the present flight data 300 can include one or more waypoints such that the flight mission for the present flight can be determined.

At (404), exemplary method (400) for adjusting the blade tip clearance target of the turbine engine 100 for a particular flight mission includes adjusting, by the one or more engine controllers 210, a model blade tip clearance target 270 based at least in part on a machine-learned model 290 and the present flight data 300, wherein the machine-learned model 290 is trained at least in part on past flight data 320 indicative of the manner in which the turbine engine 100 has been operated for one or more past flights of the flight mission. The past flight data can include, for example, one or more past flight profiles indicative of a time at phase for one or more past flights flown for the flight mission. The past flight profiles can also be indicative of one or more cruise phases for the past flights flown for the flight mission, and when the aircraft is operating in the one or more cruise phases, the blade tip clearance target can be adjusted to a predetermined target setting, such as e.g., minimum clearance setting, or a predetermined target setting that is set within a margin of the minimum clearance setting. In some implementations, the margin can be set within at least about fifty percent of the minimum clearance setting, for example.

At (406), exemplary method (400) for adjusting the blade tip clearance target of the turbine engine 100 for a particular flight mission includes generating, by the one or more engine controllers 210, an adjusted blade tip clearance target 280.

Figure 13:
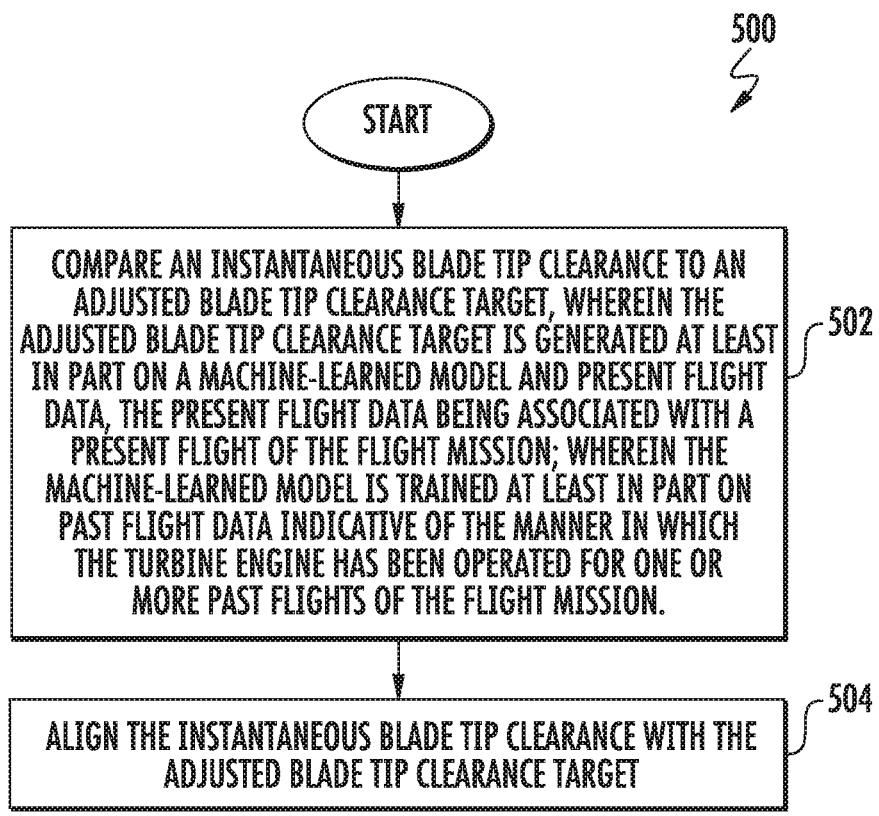
FIG. 13 provides a flow diagram of an exemplary method for adjusting blade tip clearances according to exemplary embodiments of the present disclosure.

FIG. 13 provides a flow diagram of an exemplary method (500) for adjusting blade tip clearances according to exemplary embodiments of the present disclosure. Some or all of the method (500) can be implemented by one or engine controllers 210 described herein. Some or all of the method (500) can be performed onboard the aircraft 200 and while the aircraft 200 is in operation, such as when an aircraft 200 is in flight. Alternatively, some or all of the method (500) can be performed while the aircraft 200 is not in operation and/or off board of the aircraft 200. In addition, FIG. 13 depicts method (500) in a particular order for purposes of illustration and discussion. It will be appreciated that exemplary method (500) can be modified, adapted, expanded, rearranged and/or omitted in various ways without deviating from the scope of the present subject matter.

At (502), exemplary method (500) for adjusting blade tip clearances between a rotor blade tip and a shroud of a turbine engine 100 for a particular flight mission includes comparing, by one or more engine controllers 210, an instantaneous blade tip clearance 272 to an adjusted blade tip clearance target 280, wherein the adjusted blade tip clearance target 280 is generated at least in part on a machine-learned model 290 and present flight data 300, the present flight data 300 being associated with a present flight of the flight mission.

Moreover, the machine-learned model 290 is trained at least in part on past flight data 320 indicative of the manner in which the turbine engine 100 has been operated for one or more past flights of the flight mission.

At (504), exemplary method (500) includes aligning, by the one or more engine controllers 210, the instantaneous blade tip clearance 272 with the adjusted blade tip clearance target 280.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for optimizing blade tip clearances of a turbine engine mounted to or integral with an aircraft for a flight mission, the method comprising:

obtaining, by one or more engine controllers, present flight data associated with a present flight of the flight mission;

adjusting, by the one or more engine controllers, a model blade tip clearance target based at least in part on a machine-learned model and the present flight data, wherein the machine-learned model is trained at least in part on past flight data indicative of the manner in which the turbine engine has been operated for one or more past flights of the flight mission, wherein the past flight data includes one or more past flight profiles indicative of one or more transition periods in which the aircraft is expected to perform an expected maneuver;

generating, by the one or more engine controllers, an adjusted blade tip clearance target; and in response to whether the adjusted blade tip clearance target is adjusted to a predetermined target setting prior to entering one of the one or more transition periods, adjusting, by the one or more controllers, the adjusted blade tip clearance target back to the model blade tip clearance target during the transition period.

2. The method of claim 1, wherein during obtaining, the present flight data includes one or more waypoints indicative of the flight mission for the present flight.

3. The method of claim 1, wherein the past flight data includes one or more past flight profiles indicative of a time at phase for the one or more past flights flown for the flight mission.

4. The method of claim 3, wherein the one or more past flight profiles are indicative of one or more cruise phases for the one or more past flights flown for the flight mission, and wherein when the aircraft is operating in the one or more cruise phases, the blade tip clearance target is adjusted to a predetermined target setting.

5. The method of claim 4, wherein the predetermined target setting is a minimum clearance setting.

6. The method of claim 4, wherein the predetermined target setting is set within a margin of a minimum clearance setting.

7. The method of claim 6, wherein the method further comprises:

generating, by the one or more engine controllers, a confidence score associated with the adjusted blade tip clearance; and adjusting, by the one or more engine controllers, the margin based at least in part on the confidence score associated with the adjusted blade tip clearance.

8. The method of claim 4, wherein the predetermined target setting is set within a margin of a minimum clearance setting, wherein the margin is within at least twenty-five percent of the minimum clearance setting.

9. The method of claim 1, wherein the past flight data includes one or more past operating parameters indicative of the manner in which the turbine engine has been operated for the one or more past flights of the flight mission.

10. The method of claim 9, wherein the one or more past operating parameters includes a core speed.

11. The method of claim 9, wherein the one or more past operating parameters include at least one of an aircraft gross weight and a fuel load of the aircraft.

12. The method of claim 1, wherein after the transition period, if the aircraft subsequently enters a cruise phase, the method further comprises:

adjusting, by the one or more controllers, the model blade tip clearance target back to the adjusted blade tip clearance target at a predetermined target setting during the cruise phase.

13. The method of claim 1, wherein the aircraft includes a flight management system communicatively coupled with the one or more engine controllers, and wherein the past flight data includes at least one or more past flight conditions and past flight management system data indicative of flight conditions and communications obtained from the flight management system for the one or more past flights flown for the flight mission.

14. The method of claim 1, wherein the machine-learned model is a machine or statistical learning model structured as one of a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model and a k-means model.

15. The method of claim 1, wherein the present flight data associated with a present flight for the flight mission includes one or more present operating parameters indicative of the manner in which at least one of the turbine engine and the aircraft is presently being operated for the present flight of the flight mission.

16. The method of claim 1, wherein the past flight data includes one or more past flight profiles each indicative of a transition period in which an expected maneuver is expected to be performed.

17. A method for adjusting blade tip clearances between a rotor blade tip and a shroud of a turbine engine for a flight mission, the method comprising:
comparing, by one or more engine controllers, an instantaneous blade tip clearance to an adjusted blade tip clearance target, wherein the adjusted blade tip clearance target is generated at least in part on a machine-learned model, present flight data, and within a margin of a minimum clearance setting set based at least in part on a confidence score generated by the one or more controllers, the present flight data being associated with a present flight of the flight mission; and
aligning, by the one or more engine controllers, the instantaneous blade tip clearance with the adjusted blade tip clearance target;
wherein the machine-learned model is trained at least in part on past flight data indicative of the manner in which the turbine engine has been operated for one or more past flights of the flight mission.

18. The method of claim 17, wherein the past flight data includes one or more past flight profiles indicative of a time at phase for the one or more past flights flown for the flight mission.

19. A system for adjusting blade tip clearances of a turbine engine during operation of a present flight of a flight mission, the system comprising:
one or more engine controllers comprising one or more processors and one or more memory devices, the one or more memory devices storing instructions that when executed by the one or more processors cause the one or more processors to perform operations, the one or more engine controllers configured to:
obtain present flight data associated with the present flight of the flight mission, the present flight data indicative of one or more waypoints of the present flight;
adjust a model blade tip clearance target based at least in part on a machine-learned model the present flight data, and within a margin of a minimum clearance setting set based at least in part on a confidence score generated by the one or more controllers;
generate an adjusted blade tip clearance target indicative at least in part on the manner in which the turbine engine has been actually operated for one or more past flights of the flight mission;
compare an instantaneous blade tip clearance to the adjusted blade tip clearance target, and
align the instantaneous blade tip clearance with the adjusted blade tip clearance target.

20. The system of claim 19, wherein the machine-learned model is trained at least in part on past flight data that includes one or more past operating parameters indicative of the manner in which the turbine engine has been operated for the one or more past flights of the flight mission, and wherein the one or more past operating parameters include at least one of an aircraft gross weight and a fuel load of the aircraft.

* * * * *